US010997130B2

(12) United States Patent
Yin et al.

(10) Patent No.: US 10,997,130 B2
(45) Date of Patent: May 4, 2021

(54) SYSTEMS AND METHODS FOR NODE CONSISTENCY IN A CLUSTERED DATABASE

(71) Applicant: Rubrik, Inc., Palo Alto, CA (US)

(72) Inventors: Brian Yin, San Jose, CA (US); Pin Zhou, San Jose, CA (US)

(73) Assignee: RUBRIK, INC., Palo Alto, CA (US)

( * ) Notice: Subject to any disclaimer, the term of this patent is extended or adjusted under 35 U.S.C. 154(b) by 256 days.

(21) Appl. No.: 16/264,361

(22) Filed: Jan. 31, 2019

(65) Prior Publication Data

US 2020/0250151 A1 Aug. 6, 2020

(51) Int. Cl.
*G06F 16/00* (2019.01)
*G06F 16/21* (2019.01)
*G06F 16/28* (2019.01)
*G06F 16/30* (2019.01)

(52) U.S. Cl.
CPC ............ *G06F 16/21* (2019.01); *G06F 16/219* (2019.01); *G06F 16/285* (2019.01)

(58) Field of Classification Search
CPC ...... G06F 16/27; G06F 16/273; G06F 16/285; G06F 16/2228; G06F 16/278; G06F 16/2282; G06F 16/182; G06F 16/2365; G06F 16/2358; G06F 16/178; G06F 16/1873; G06F 16/24568
See application file for complete search history.

(56) References Cited

U.S. PATENT DOCUMENTS

| | | | | |
|---|---|---|---|---|
| 9,015,121 | B1* | 4/2015 | Salamon | G06F 11/1484 |
| | | | | 707/640 |
| 9,235,481 | B1* | 1/2016 | Natanzon | G06F 1/24 |
| 9,514,208 | B2* | 12/2016 | Srinivasan | G06F 16/27 |
| 9,823,973 | B1* | 11/2017 | Natanzon | G06F 11/1451 |
| 10,268,744 | B2* | 4/2019 | Guney | G06F 16/2471 |
| 10,558,531 | B2* | 2/2020 | Sehgal | G06F 11/1451 |
| 10,621,049 | B1* | 4/2020 | Certain | G06F 11/1471 |
| 10,713,134 | B2* | 7/2020 | Wang | G06F 11/2048 |
| 10,740,353 | B2* | 8/2020 | Horowitz | G06F 11/14 |

(Continued)

OTHER PUBLICATIONS

"U.S. Appl. No. 16/264,329, Response filed Nov. 17, 2020 to Non Final Office Action dated Aug. 20, 2020", 14 pages.

*Primary Examiner* — Polina G Peach
(74) *Attorney, Agent, or Firm* — Schwegman Lundberg & Woessner, P.A.

(57) ABSTRACT

Systems and methods for node consistency in a clustered database are described. The system automatically identifies an addition of a first node to a clustered database on a source storage platform. The system initializes the first node on the source storage platform communicating a first node agent to the first node. The first node agent is configured to execute on the first node to extract the operation log at the source storage platform and stream the operation log to the secondary storage platform. The system versions a first version of the clustered database. The versioning of the first version including not storing a version of the operation log associated with the first node at the secondary storage platform responsive to identifying, during the first interval of time, the synchronizing of the operation log at the first node having not been synchronized, in a prior version of the clustered database, with the operation log at the storage platform.

20 Claims, 28 Drawing Sheets

(56) References Cited

U.S. PATENT DOCUMENTS

| | | | |
|---|---|---|---|
| 2008/0082770 A1* | 4/2008 | Ahal | G06F 11/2074 |
| | | | 711/162 |
| 2013/0124475 A1* | 5/2013 | Hildenbrand | G06F 16/2315 |
| | | | 707/636 |
| 2013/0290249 A1* | 10/2013 | Merriman | G06F 16/278 |
| | | | 707/610 |
| 2014/0181579 A1* | 6/2014 | Whitehead | G06F 11/1451 |
| | | | 714/15 |
| 2015/0142747 A1* | 5/2015 | Zou | G06F 11/1407 |
| | | | 707/649 |
| 2015/0293984 A1* | 10/2015 | Zolotusky, Jr. | G06F 16/27 |
| | | | 707/634 |
| 2016/0057219 A1* | 2/2016 | Kore | H04L 67/1097 |
| | | | 709/248 |
| 2017/0147602 A1* | 5/2017 | Darcy | H04L 63/10 |
| 2018/0101589 A1* | 4/2018 | Shi | G06F 16/273 |
| 2018/0143884 A1* | 5/2018 | Brunzema | G06F 11/1471 |
| 2018/0300203 A1* | 10/2018 | Kathpal | G06F 16/278 |
| 2019/0012357 A1* | 1/2019 | Schreter | G06F 16/134 |
| 2019/0332692 A1* | 10/2019 | Rachapudi | G06F 16/1844 |
| 2020/0034245 A1* | 1/2020 | Kohler | G06F 11/1458 |
| 2020/0226035 A1* | 7/2020 | Li | G06F 11/1474 |

\* cited by examiner

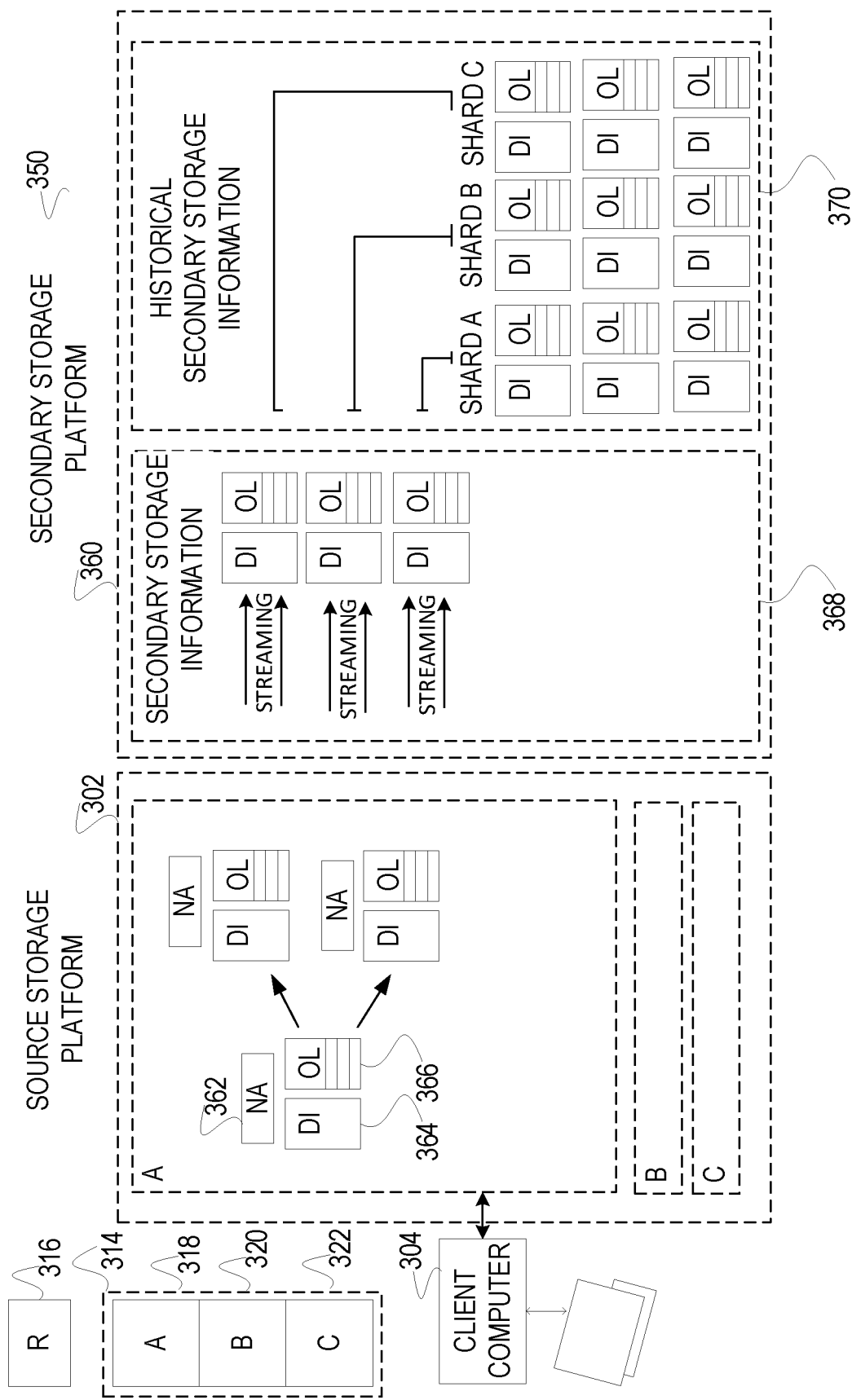

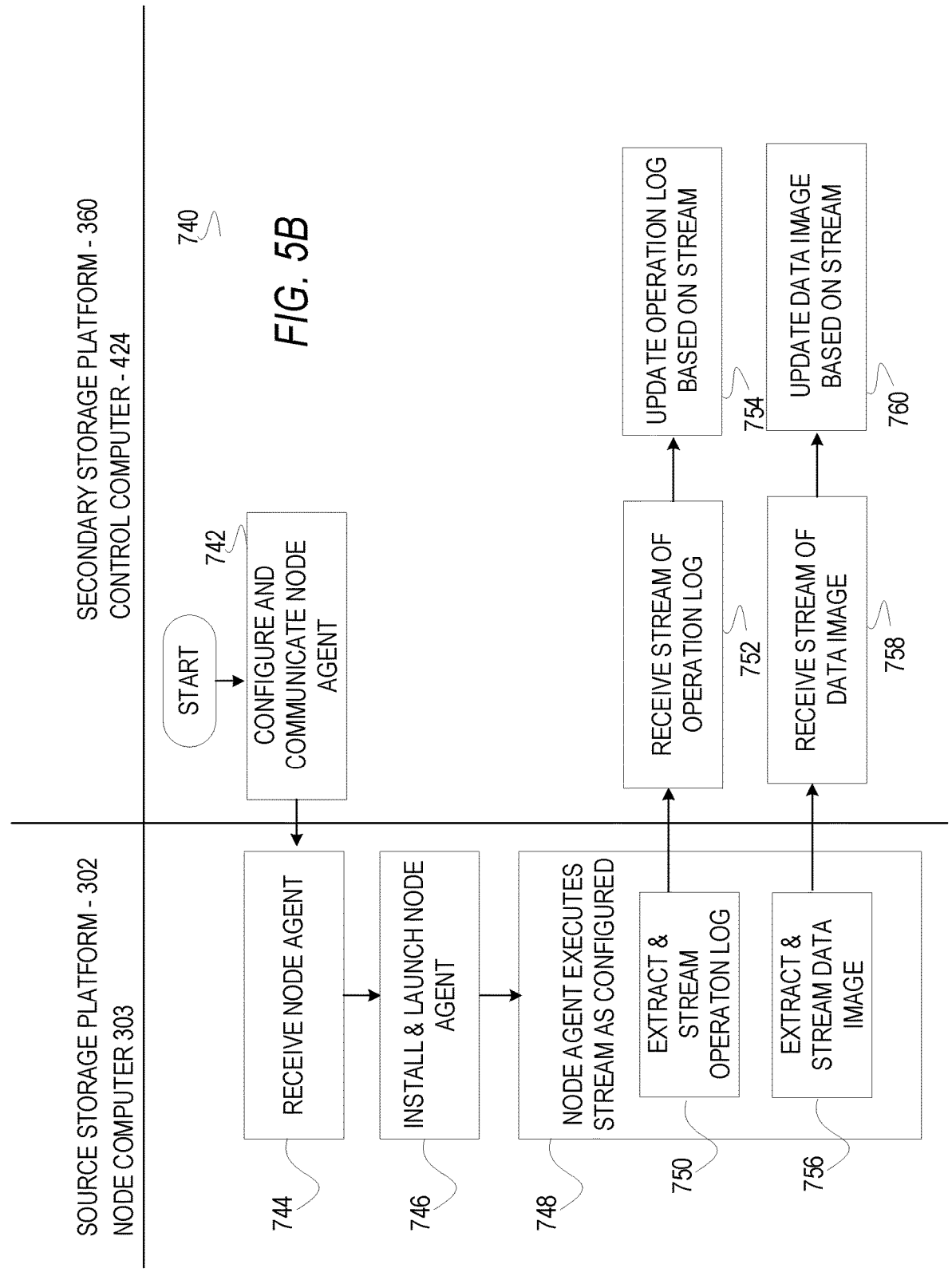

SYSTEMS AND METHODS FOR NODE CONSISTENCY IN A CLUSTERED DATABASE

TECHNICAL FIELD

This disclosure relates to the technical field of database maintenance and more particularly to node consistency in a clustered database.

BACKGROUND

Clustered databases typically include one or more shards each comprised one or more node computers. Clustered databases may have topology changes. For example, shards may be added or removed. Also, for example, node computers may be added or removed.

BRIEF DESCRIPTION OF THE DRAWINGS

FIG. 1E is a block diagram illustrating a system, according to an embodiment, to store data on a secondary storage platform;

FIG. 5B is a block diagram illustrating a method, according to an embodiment, to configure and communicate a node agent;

DETAILED DESCRIPTION

Figure 1A:
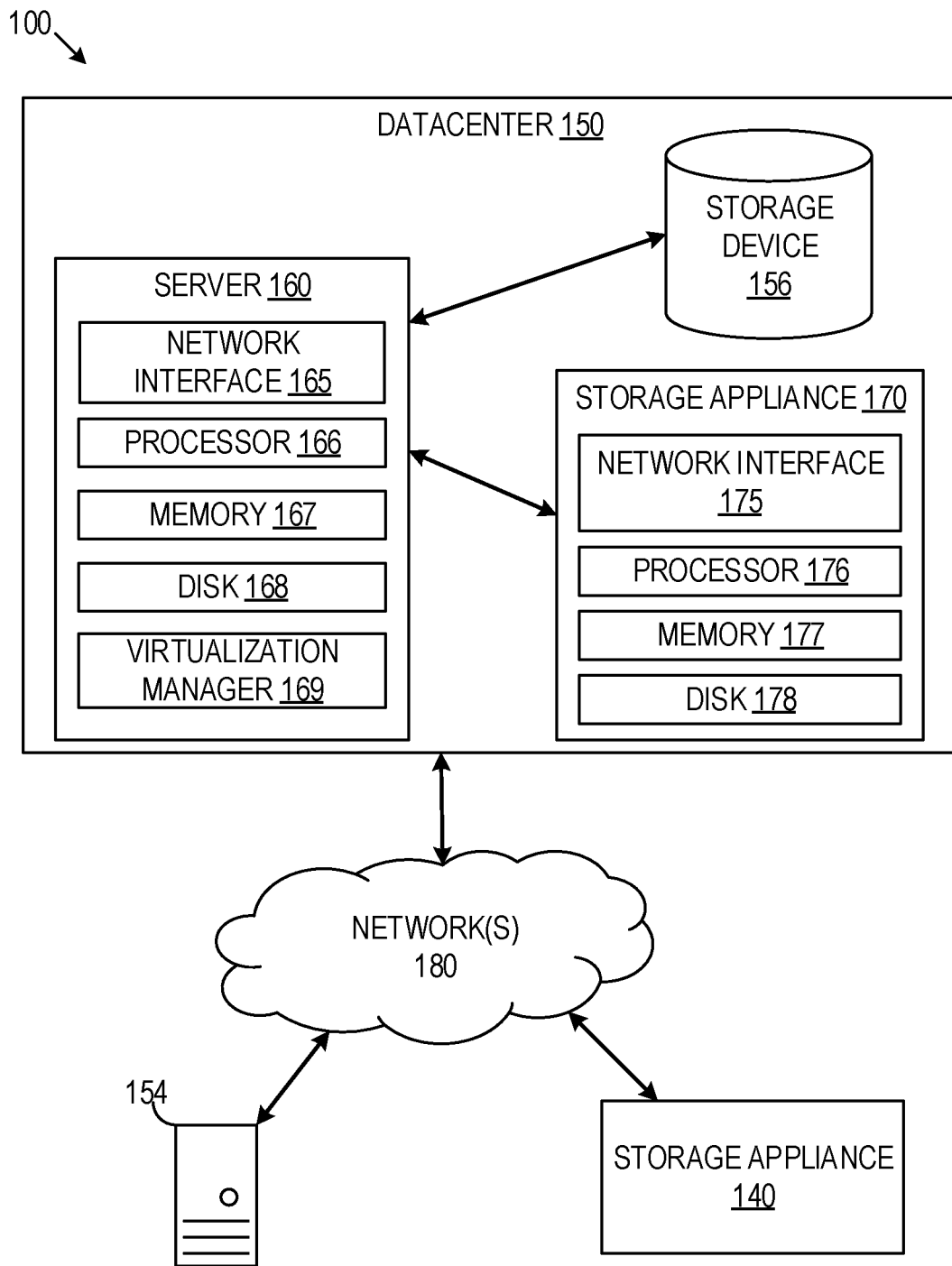
FIG. 1A is a block diagram illustrating a networked computing environment, according to an embodiment.

This description is directed at three aspects of a clustered database including a topology change, node consistency, and shard consistency.

According to a first aspect directed at a topology change, a clustered database, stored at a source storage platform, may be monitored by a control computer. The control computer may periodically communicate a query, over a network, to the source storage platform. The query may enquire of a topology change in the clustered database. The clustered database may be managed by a software program. For example, the clustered database may be managed by MongoDB®, a cross-platform document-oriented database program. The clustered database may include a data image including documents. For example, the documents may be different types of files. The control computer may receive a message responsive to the query. The message may describe the topology of the clustered database. The control computer may identify a topology change in the clustered database based on the message. For example, the control computer may identify a shard being added, a shard being removed, a node computer being added, or a node computer being removed. The control computer may respond to identifying a node computer addition by communicating a node agent to the first node computer. The control computer may configure the node agent to execute on the node computer to extract a data image of the clustered database and to stream the data image to the secondary storage platform.

According to a second aspect directed at node consistency, a clustered database, stored at a source storage platform, may be monitored by a control computer. The control computer may identify a topology change in the clustered database. For example, the control computer may identify a node computer being added to the clustered database at the source storage platform. In response to identifying the node computer being added, the control computer may configure a node agent and communicate the node agent to the node computer. For example, the control computer may configure the node agent to extract an operation log at the node computer and stream the operation log to a secondary storage platform. The control computer may further version a first version of the clustered database at the secondary storage platform. The control computer may version the first version to not include a version of the operation log responsive to identifying the operation log, at the node computer, as having not been synchronized, in a prior version of the clustered database, with the operation log at the secondary storage platform.

According to a third aspect directed at shard consistency, a clustered database, stored at a source storage platform, may be monitored by a control computer. The control computer may identify a topology change in the clustered database. For example, the control computer may identify a shard being added to the clustered database at the source storage platform. The shard may include a first node. In response to identifying the shard being added, the control computer may configure a node agent and communicate the node agent to the first node. For example, the control computer may configure the node agent to extract a data image and an operation log at the node computer and stream the operation log to a secondary storage platform. The control computer may further version a first version of the clustered database at the secondary storage platform. The control computer may version a first version of the clustered database by storing a version of the data image and operation log for the shard being added in association with a timestamp that is different than the timestamp for the other shards in the clustered database.

FIG. 1A depicts one embodiment of a networked computing environment 100 in which the disclosed technology may be practiced. As depicted, the networked computing environment 100 includes a data center 150, a storage appliance 140, and a computing device 154 in communication with each other via one or more networks 180. The networked computing environment 100 may include a plurality of computing devices interconnected through one or more networks 180. The one or more networks 180 may allow computing devices and/or storage devices to connect to and communicate with other computing devices and/or other storage devices. In some cases, the networked computing environment may include other computing devices and/or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The data center 150 may include one or more servers, such as server 160, in communication with one or more storage devices, such as storage device 156. The one or more servers may also be in communication with one or more storage appliances, such as storage appliance 170. The server 160, storage device 156, and storage appliance 170 may be in communication with each other via a networking fabric connecting servers and data storage units within the data center to each other. The storage appliance 170 may include a data management system for backing up virtual machines and/or files within a virtualized infrastructure. The server 160 may be used to create and manage one or more virtual machines associated with a virtualized infrastructure.

The one or more virtual machines may run various applications, such as a database application or a web server. The one or more virtual machines may run various applications, such as a database application or a web server. The storage device 156 may include one or more hardware storage devices for storing data, such as a hard disk drive (HDD), a magnetic tape drive, a solid-state drive (SSD), a storage area network (SAN) storage device, or a networked-attached storage (NAS) device. In some cases, a data center, such as data center 150, may include thousands of servers and/or data storage devices in communication with each 50 other. The data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 180 may include a secure network such as an enterprise private network, an unsecure network such as a wireless open network, a local area network (LAN), a wide area network (WAN), and the Internet. The one or more networks 180 may include a cellular network, a mobile network, a wireless network, or a wired network. Each network of the one or more networks 180 may include hubs, bridges, routers, switches, and wired transmission media such as a direct-wired connection. The one or more networks 180 may include an extranet or other private network for securely sharing information or providing controlled access to applications or files.

A server, such as server 160, may allow a client to download information or files (e.g., executable, text, application, audio, image, or video files) from the server or to perform a search query related to particular information stored on the server. In some cases, a server may act as an application server or a file server. In general, a server may refer to a hardware device that acts as the host in a client-server relationship or a software process that shares a resource with or performs work for one or more clients.

One embodiment of server 160 includes a network interface 165, processor 166, memory 167, disk 168, and virtualization manager 169 all in communication with each other. Network interface 165 allows server 160 to connect to one or more networks 180. Network interface 165 may include a wireless network interface and/or a wired network interface. Processor 166 allows server 160 to execute computer readable instructions stored in memory 167 in order to perform processes described herein. Processor 166 may include one or more processing units, such as one or more CPUs and/or one or more GPUs. Memory 167 may comprise one or more types of memory (e.g., RAM, SRAM, DRAM, ROM, EEPROM, Flash, etc.). Disk 168 may include a hard disk drive and/or a solid-state drive. Memory 167 and disk 168 may comprise hardware storage devices.

The virtualization manager 169 may manage a virtualized infrastructure and perform management operations associated with the virtualized infrastructure. The virtualization manager 169 may manage the provisioning of virtual machines running within the virtualized infrastructure and provide an interface to computing devices interacting with the virtualized infrastructure. In one example, the virtualization manager 169 may set a virtual machine into a frozen state in response to a snapshot request made via an application programming interface (API) by a storage appliance, such as storage appliance 170. Setting the virtual machine into a frozen state may allow a point in time snapshot of the virtual machine to be stored or transferred. In one example, updates made to a virtual machine that has been set into a frozen state may be written to a separate file (e.g., an update file) while the virtual d may be set into a read-only state to prevent modifications to the virtual disk file while the virtual machine is in the frozen state.

The virtualization manager 169 may then transfer data associated with the virtual machine (e.g., an image of the virtual machine or a portion of the image of the virtual disk file associated with the state of the virtual disk at the point in time is frozen. The virtual disk file machine) to a storage appliance in response to a request made by the storage appliance. After the data associated with the point in time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 169 may perform various virtual machine related tasks, such as cloning virtual machines, creating new virtual machines, monitoring the state of virtual machines, moving virtual machines between physical hosts for load balancing purposes, and facilitating backups of virtual machines.

One embodiment of storage appliance 170 includes a network interface 175, processor 176, memory 177, and disk 178 all in communication with each other. Network interface 175 allows storage appliance 170 to connect to one or more networks 180. Network interface 175 may include a wireless network interface and/or a wired network interface. Processor 176 allows storage appliance 170 to execute computer readable instructions stored in memory 177 in order to perform processes described herein. Processor 176 may include one or more processing units, such as one or more CPUs and/or one or more GPUs. Memory 177 may comprise one or more types of memory (e.g., RAM, SRAM, DRAM, ROM, EEPROM, NOR Flash, NAND Flash, etc.). Disk 178 may include a hard disk drive and/or a solid-state drive. Memory 177 and disk 178 may comprise hardware storage devices.

In one embodiment, the storage appliance 170 may include four machines. Each of the four machines may include a multi-core CPU, 64 GB of RAM, a 400 GB SSD, three 4 TB HDDs, and a network interface controller. In this case, the four machines may be in communication with the one or more networks 180 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point in time versions of 1000 virtual machines. The networked computing environment 100 may provide a cloud computing environment for one or more computing devices. Cloud computing may refer to Internet-based computing, wherein shared resources, software, and/or information may be provided to one or more computing devices on-demand via the Internet.=The networked computing environment 100 may comprise a cloud computing environment providing Software-as-a-Service (SaaS) or Infrastructure-as-a Service (IaaS) services. SaaS may refer to a software distribution model in which applications are hosted by a service provider and made available to end users over the Internet. In one embodiment, the networked computing environment 100 may include a virtualized infrastructure that provides software, data processing, and/or data storage services to end users accessing the services via the networked computing environment. In one example, networked computing environment 100 may provide cloud-based work productivity or business-related applications to a computing device, such as computing device 154. The storage appliance 140 may comprise a cloud-based data management system for backing up virtual machines and/or files within a virtualized infrastructure, such as virtual machines running on server 160 or files stored on server 160.

In some cases, networked computing environment 100 may provide remote access to secure applications and files stored within data center 150 from a remote computing device, such as computing device 154. The data center 150 may use an access control application to manage remote access to protected resources, such as protected applications, databases, or files located within the data center. To facilitate remote access to secure applications and files, a secure network connection may be established using a virtual private network (VPN). A VPN connection may allow a remote computing device, such as computing device 154, to securely access data from a private network (e.g., from a company file server or mail server) using an unsecure public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 170 may manage the extraction and storage of virtual machine snapshots associated with different point in time versions of one or more virtual machines running within the data center 150. A snapshot of a virtual machine may correspond with a state of the virtual machine at a particular point in time. In response to a restore command from the server 160, the storage appliance 170 may restore a point in time version of a virtual machine or restore point in time versions of one or more files located on the virtual machine and transmit the restored data to the server 160. In response to a mount command from the server 160, the storage appliance 170 may allow a point in time version of a virtual machine to be mounted and allow the server 160 to read and/or modify data associated with the point in time version of the virtual machine. To improve storage density, the storage appliance 170 may deduplicate and compress data associated with different versions of a virtual machine and/or deduplicate and compress data associated with different virtual machines. To improve system performance, the storage appliance 170 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point in time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental was captured and any other forward incremental files that were captured subsequent to the last full image and prior to the forward incremental file). A reverse incremental file may include a set of data representing changes from a later point in time snapshot of a virtual machine. To generate a snapshot of the virtual machine corresponding with a reverse incremental file, the reverse incremental file may be combined with a later point in time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 170 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 170 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 170 may run an NFS server and make the particular version (or a copy of the particular version) of the virtual machine accessible for reading and/or writing. The end user of the storage appliance 170 may then select the particular version to be mounted and run an application (e.g., a data analytics application) using the mounted version of the virtual machine. In another example, the particular version may be mounted as an iSCSI target.

Figure 1B:
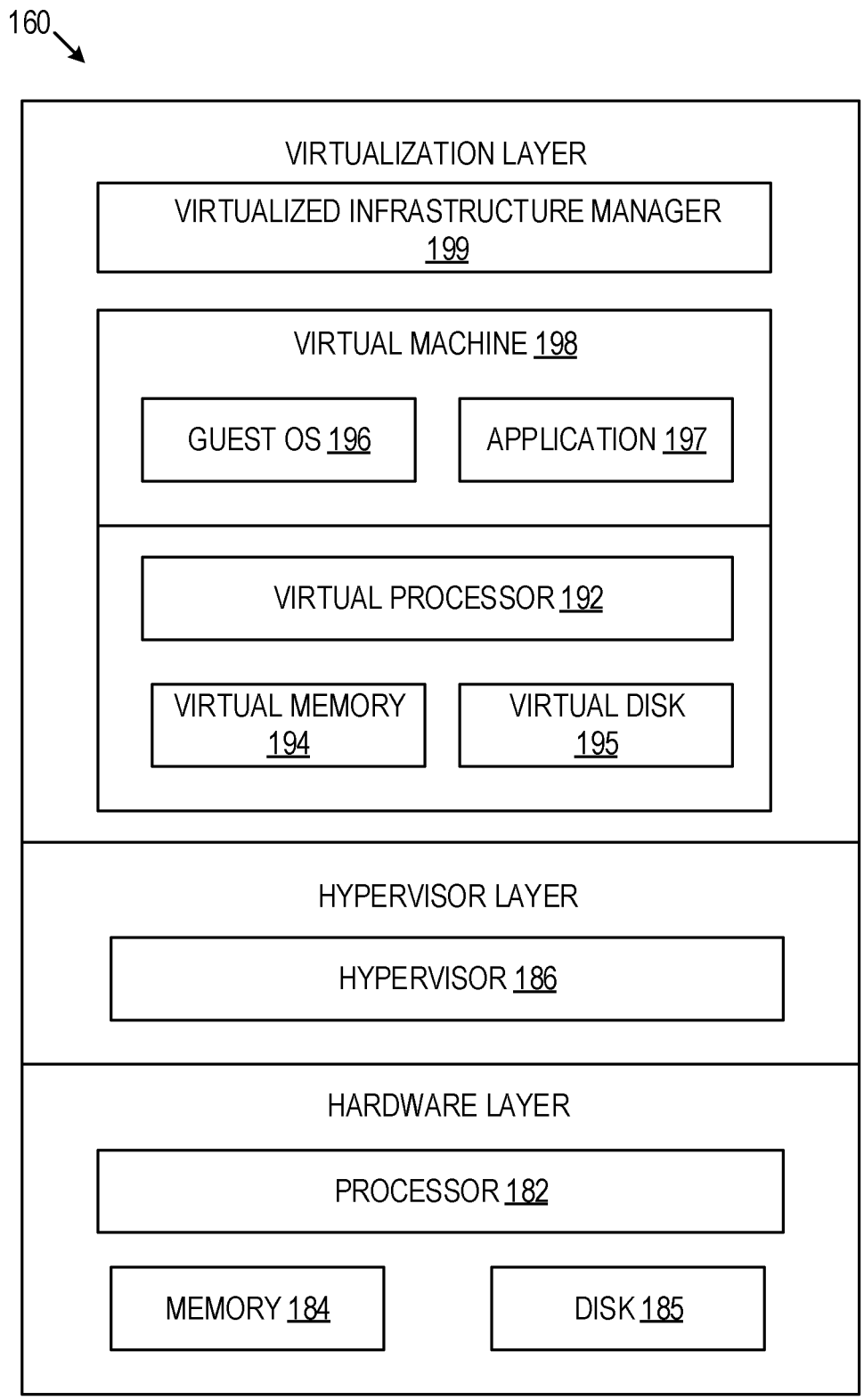
FIG. 1B is a block diagram illustrating a server, according to an embodiment.

FIG. 1B depicts one embodiment of server 160 in FIG. 1A. The server 160 may comprise one server out of a plurality of servers that are networked together within a data center. In one example, the plurality of servers may be positioned within one or more server racks within the data center. As depicted, the server 160 includes hardware-level components and software-level components. The hardware-level components include one or more processors 182, one or more memory 184, and one or more disks 185. The software-level components include a hypervisor 186, a virtualized infrastructure manager 199, and one or more virtual machines, such as virtual machine 198. The hypervisor 186 may comprise a native hypervisor or a hosted hypervisor. The hypervisor 186 may provide a virtual operating platform for running one or more virtual machines, such as virtual machine 198. Virtual machine 198 includes a plurality of virtual hardware devices including a virtual processor 192, a virtual memory 194, and a virtual disk 195. The virtual disk 195 may comprise a file stored within the one or more disks 185. In one example, a virtual machine may include a plurality of virtual disks, with each virtual disk of the plurality of virtual disks associated with a different file stored on the one or more disks 185. Virtual machine 198 may include a guest operating system 196 that runs one or more applications, such as application 197.

The virtualized infrastructure manager 199, which may correspond with the virtualization manager 169 in FIG. 1A, may run on a virtual machine or natively on the server 160. The virtualized infrastructure manager 199 may provide a centralized platform for managing a virtualized infrastructure that includes a plurality of virtual machines. The virtualized infrastructure manager 199 may manage the provisioning of virtual machines running within the virtualized infrastructure and provide an interface to computing devices interacting with the virtualized infrastructure. The virtualized infrastructure manager 199 may perform various virtualized infrastructure related tasks, such as cloning virtual machines, creating new virtual machines, monitoring the state of virtual machines, and facilitating backups of virtual machines.

In one embodiment, the server 160 may use the virtualized infrastructure manager 199 to facilitate backups for a plurality of virtual machines (e.g., eight different virtual machines) running on the server 160. Each virtual machine running on the server 160 may run its own guest operating system and its own set of applications. Each virtual machine running on the server 160 may store its own set of files using one or more virtual disks associated with the virtual machine (e.g., each virtual machine may include two virtual disks that are used for storing data associated with the virtual machine).

In one embodiment, a data management application running on a storage appliance, such as storage appliance 140 in FIG. 1A or storage appliance 170 in FIG. 1A, may request a snapshot of a virtual machine running on server 160. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 199 may set the virtual machine into a frozen state or store a copy of the virtual machine at the particular point in time. The virtualized infrastructure manager 199 may then transfer data associated with the virtual machine (e.g., an image of the virtual machine or a portion of the image of the virtual machine) to the storage appliance. The data associated with the virtual machine may include a set of files including a virtual disk file storing contents of a virtual disk of the virtual machine at the particular point in time and a virtual machine configuration file storing configuration settings for the virtual machine at the particular point in time. The contents of the virtual disk file may include the operating system used by the virtual machine, local applications stored on the virtual disk, and user files (e.g., images and word processing documents). In some cases, the virtualized infrastructure manager 199 may transfer a full image of the virtual machine to the storage appliance or a plurality of data blocks corresponding with the full image (e.g., to enable a full image-level backup of the virtual machine to be stored on the storage appliance). In other cases, the virtualized infrastructure manager 199 may transfer a portion of an image of the virtual machine associated with data that has changed since an earlier point in time prior to the particular point in time or since a last snapshot of the virtual machine was taken. In one example, the virtualized infrastructure manager 199 may transfer only data associated with virtual blocks stored on a virtual disk of the virtual machine that have changed since the last snapshot of the virtual machine was taken. In one embodiment, the data management application may specify a first point in time and a second point in time and the virtualized infrastructure manager 199 may output one or more virtual data blocks associated with the virtual machine that have been modified between the first point in time and the second point in time.

In some embodiments, the server 160 may or the hypervisor 186 may communicate with a storage appliance, such as storage appliance 140 in FIG. 1A or storage appliance 170 in FIG. 1A, using a distributed file system protocol such as Network File System (NFS) Version 3. The distributed file system protocol may allow the server 160 or the hypervisor 186 to access, read, write, or modify files stored on the storage appliance as if the files were locally stored on the server. The distributed file system protocol may allow the server 160 or the hypervisor 186 to mount a directory or a portion of a file system located within the storage appliance.

Figure 1C:
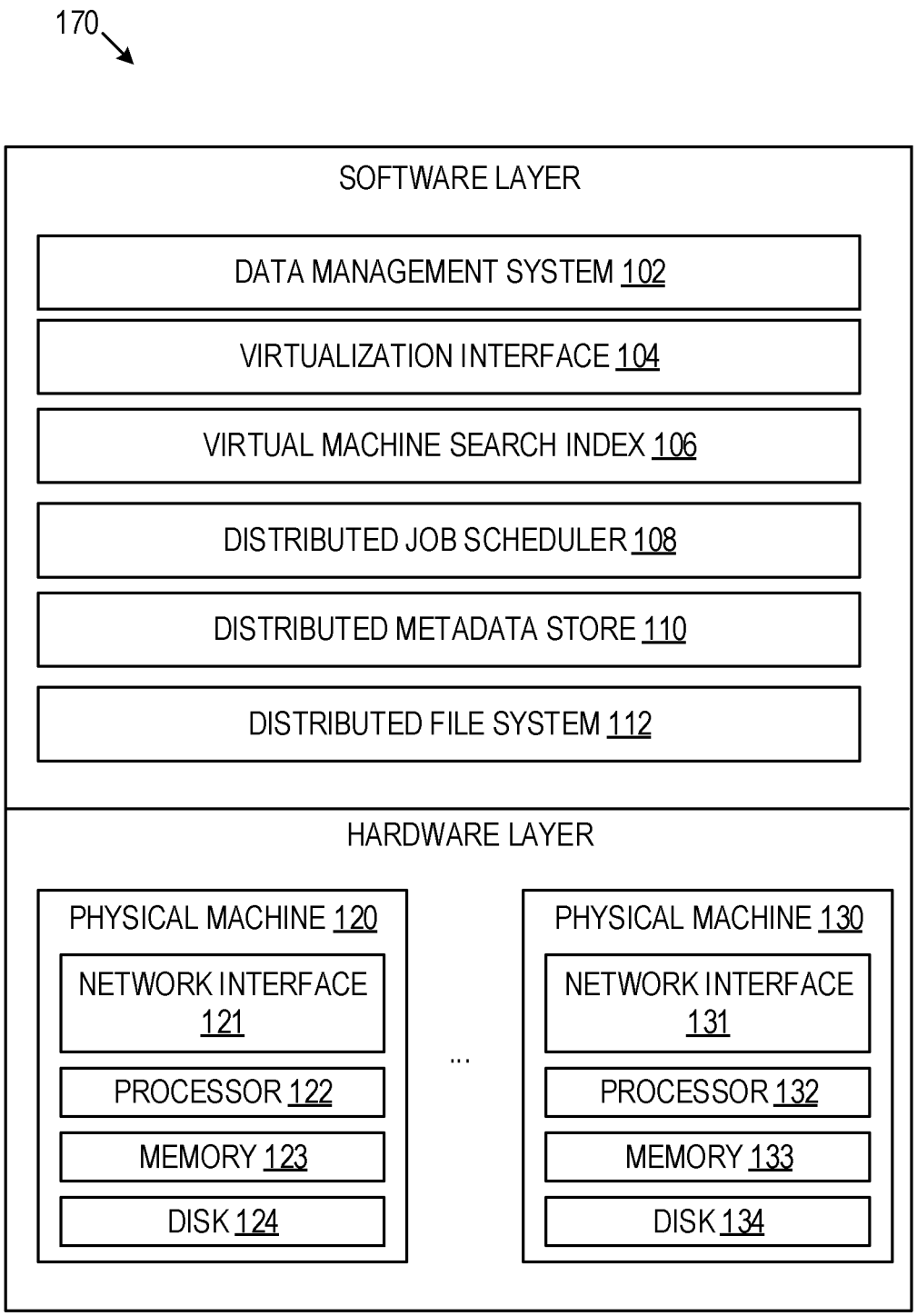
FIG. 1C is a block diagram illustrating software components, according to an embodiment.

FIG. 1C depicts one embodiment of storage appliance 170 in FIG. 1A. The storage appliance may include a plurality of physical machines that may be grouped together and presented as a single computing system. Each physical machine of the plurality of physical machines may comprise a node in a cluster (e.g., a failover cluster). In one example, the storage appliance may be positioned within a server rack within a data center. As depicted, the storage appliance 170 includes hardware-level components and software-level components. The hardware-level components include one or more physical machines, such as physical machine 120 and physical machine 130. The physical machine 120 includes a network interface 121, processor 122, memory 123, and disk 124 all in communication with each other. Processor 122 allows physical machine 120 to execute computer readable instructions stored in memory 123 to perform processes described herein. Disk 124 may include a hard disk drive and/or a solid-state drive. The physical machine 130 includes a network interface 131, processor 132, memory 133, and disk 134 all in communication with each other. Processor 132 allows physical machine 130 to execute computer readable instructions stored in memory 133 to perform processes described herein. Disk 134 may include a hard disk drive and/or a solid-state drive. In some cases, disk 134 may include a flash-based SSD or a hybrid HDD/SSD drive. In one embodiment, the storage appliance 170 may include a plurality of physical machines arranged in a cluster (e.g., eight machines in a cluster). Each of the plurality of physical machines may include a plurality of multi-core CPUs, 128 GB of RAM, a 500 GB SSD, four 4 TB HDDs, and a network interface controller.

In some embodiments, the plurality of physical machines may be used to implement a cluster-based network file-server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some cases, the file system protocol used by a server, such as server 160 in FIG. 1A, or a hypervisor, such as hypervisor 186 in FIG. 1B, to communicate with the storage appliance 170 may not provide a failover mechanism (e.g., NFS Version 3). In the case that no failover mechanism is provided on the client side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In this case, a hypervisor, such as hypervisor 186 in FIG. 1B may be configured with a first floating IP address associated with a first node in the cluster. The hypervisor may connect to the cluster using the first floating IP address. In one example, the hypervisor may communicate with the cluster using the NFS Version 3 protocol.

Each node in the cluster may run a Virtual Router Redundancy Protocol (VRRP) daemon. A daemon may comprise a background process. Each VRRP daemon may include a list of all floating IP addresses available within the cluster. In the event that the first node associated with the first floating IP address fails, one of the VRRP daemons may automatically assume or pick up the first floating IP address if no other VRRP daemon has already assumed the first floating IP address. Therefore, if the first node in the cluster fails or otherwise goes down, then one of the remaining VRRP daemons running on the other nodes in the cluster may assume the first floating IP address that is used by the hypervisor for communicating with the cluster.

In order to determine which of the other nodes in the cluster will assume the first floating IP address, a VRRP priority may be established. In one example, given a number (N) of nodes in a cluster from node(0) to node(N−1), for a floating IP address (i), the VRRP priority of nodeG) may be G−i) modulo N. In another example, given a number (N) of nodes in a cluster from node(0) to node(N−1), for a floating IP address (i), the VRRP priority of nodeG) may be (i−j) modulo N. In these cases, nodeG) will assume floating IP address (i) only if its VRRP priority is higher than that of any other node in the cluster that is alive and announcing itself on the network. Thus, if a node fails, then there may be a clear priority ordering for determining which other node in the cluster will take over the failed node's floating IP address.

In some cases, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

As depicted in FIG. 1C, the software-level components of the storage appliance 170 may include data management system 102, a virtualization interface 104, a distributed job scheduler 108, a distributed metadata store 110, a distributed file system 112, and one or more virtual machine search indexes, such as virtual machine search index 106. In one embodiment, the software-level components of the storage appliance 170 may be run using a dedicated hardware-based appliance. In another embodiment, the software-level components of the storage appliance 170 may be run from the cloud (e.g., the software-level components may be installed on a cloud service provider).

In some cases, the data storage across a plurality of nodes in a cluster (e.g., the data storage available from the one or more physical machines) may be aggregated and made available over a single file system namespace (e.g., /snap-shots/). A directory for each virtual machine protected using the storage appliance 170 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in /snapshots/VM_A/s1/ and a second snapshot of Virtual Machine A may reside in /snapshots/VM_A/s2/).

The distributed file system 112 may present itself as a single file system, in which as new physical machines or nodes are added to the storage appliance 170, the cluster may automatically discover the additional nodes and automatically increase the available capacity of the file system for storing files and other data. Each file stored in the distributed file system 112 may be partitioned into one or more chunks or shards. Each of the one or more chunks may be stored within the distributed file system 112 as a separate file. The files stored within the distributed file system 112 may be replicated or mirrored over a plurality of physical machines, thereby creating a load-balanced and fault tolerant distributed file system. In one example, storage appliance 170 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 110 may include a distributed database management system that provides high availability without a single point of failure. In one embodiment, the distributed metadata store 110 may comprise a database, such as a distributed document-oriented database. The distributed metadata store 110 may be used as a distributed key value storage system. In one example, the distributed metadata store 110 may comprise a distributed NoSQL key value store database. In some cases, the distributed metadata store 110 may include a partitioned row store, in which rows are organized into tables or other collections of related data held within a structured format within the key value store database. A table (or a set of tables) may be used to store metadata information associated with one or more files stored within the distributed file system 112. The metadata information may include the name of a file, a size of the file, file permissions associated with the file, when the file was last modified, and file mapping information associated with an identification of the location of the file stored within a cluster of physical machines. In one embodiment, a new file corresponding with a snapshot of a virtual machine may be stored within the distributed file system 112 and metadata associated with the new file may be stored within the distributed metadata store 110. The distributed metadata store 110 may also be used to store a backup schedule for the virtual machine and a list of snapshots for the virtual machine that are stored using the storage appliance 170.

In some cases, the distributed metadata store 110 may be used to manage one or more versions of a virtual machine. Each version of the virtual machine may correspond with a full image snapshot of the virtual machine stored within the distributed file system 112 or an incremental snapshot of the virtual machine (e.g., a forward incremental or reverse incremental) stored within the distributed file system 112. In one embodiment, the one or more versions of the virtual machine may correspond with a plurality of files. The plurality of files may include a single full image snapshot of the virtual machine and one or more incrementals derived from the single full image snapshot. The single full image snapshot of the virtual machine may be stored using a first storage device of a first type (e.g., a HDD) and the one or more incrementals derived from the single full image snapshot may be stored using a second storage device of a second type (e.g., an SSD). In this case, only a single full image needs to be stored and each version of the virtual machine may be generated from the single full image or the single full image combined with a subset of the one or more incrementals. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incrementals.

The distributed job scheduler 108 may be used for scheduling backup jobs that acquire and store virtual machine snapshots for one or more virtual machines over time. The distributed job scheduler 108 may follow a backup schedule to backup an entire image of a virtual machine at a particular point in time or one or more virtual disks associated with the virtual machine at the particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some cases, the distributed job scheduler 108 may schedule a specific job to be run on a particular node based on data stored on the particular node. For example, the distributed job scheduler 108 may schedule a virtual machine snapshot job to be run on a node in a cluster that is used to store snapshots of the virtual machine in order to reduce network congestion.

The distributed job scheduler 108 may comprise a distributed fault tolerant job scheduler, in which jobs affected by node failures are recovered and rescheduled to be run on available nodes. In one embodiment, the distributed job scheduler 108 may be fully decentralized and implemented without the existence of a master node. The distributed job scheduler 108 may run job scheduling processes on each node in a cluster or on a plurality of nodes in the cluster. In one example, the distributed job scheduler 108 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 110. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 108 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In one embodiment, the job scheduling processes may detect that a particular task for a particular job has failed and in response may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 108 may manage a job in which a series of tasks associated with the job are to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks were ever performed. The series of tasks may correspond with an ordering of tasks for the series of tasks and the distributed job scheduler 108 may ensure that each task of the series of tasks is executed based on the ordering of tasks. Tasks that do not have dependencies with each other may be executed in parallel.

In some cases, the distributed job scheduler 108 may schedule each task of a series of tasks to be performed on a specific node in a cluster. In other cases, the distributed job scheduler 108 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated 20 with a job may have an affinity to a specific node in a cluster.

In one example, if the one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 108 may assign one or more tasks associated with a job to be 30 executed on a particular node in a cluster based on the location of data required to be accessed by the one or more tasks.

In one embodiment, the distributed job scheduler 108 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 199 in FIG. 1B, to create a frozen copy of the virtual machine and to transfer one or more chunks (or one or more files) associated with the frozen copy to a storage appliance, such as storage appliance 170 in FIG. 1A. The one or more tasks may also include generating metadata for the one or more chunks, storing the metadata using the distributed metadata store 110, storing the one or more chunks within the distributed file system 112, and communicating with the virtualized infrastructure manager that the virtual machine the frozen copy of the virtual machine may be unfrozen or released for a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 112 (e.g., the first chunk is located at /snapshotsNM_B/sVs1.chunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 104 may provide an interface for communicating with a virtualized infrastructure manager managing a virtualization infrastructure, such as virtualized infrastructure manager 199 in FIG. 1B, and requesting data associated with virtual machine snapshots from the virtualization infrastructure. The virtualization interface 104 may communicate with the virtualized infrastructure manager using an API for accessing the virtualized infrastructure manager (e.g., to communicate a request for a snapshot of a virtual machine). In this case, storage appliance 170 may request and receive data from a virtualized infrastructure without requiring agent software to be installed or running on virtual machines within the virtualized infrastructure. The virtualization interface 104 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 106 may include a list of files that have been stored using a virtual machine and a version history for each of the files in the list. Each version of a file may be mapped to the earliest point in time snapshot of the virtual machine that includes the version of the file or to a snapshot of the virtual machine that include the version of the file (e.g., the latest point in time snapshot of the virtual machine that includes the version of the file). In one example, the virtual machine search index 106 may be used to identify a version of the virtual machine that includes a particular version of a file (e.g., a particular version of a database, a spreadsheet, or a word processing document). In some cases, each of the virtual machines that are backed up or protected using storage appliance 170 may have a corresponding virtual machine search index.

In one embodiment, as each snapshot of a virtual machine is ingested each virtual disk associated with the virtual machine is parsed in order to identify a file system type associated with the virtual disk and to extract metadata (e.g., file system metadata) for each file stored on the virtual disk.

The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some cases, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 112 in FIG. 1C. The data management system 102 may comprise an application running on the storage appliance that manages and stores one or more snapshots of a virtual machine. In one example, the data management system 102 may comprise a highest-level layer in an integrated software stack running on the storage appliance. The integrated software stack may include the data management system 102, the virtualization interface 104, the distributed job scheduler 108, the distributed metadata store 110, and the distributed file system 112.

In some cases, the integrated software stack may run on other computing devices, such as a server or computing device 154 in FIG. 1A. The data management system 102 may use the virtualization interface 104, the distributed job scheduler 108, the distributed metadata store 110, and the distributed file system 112 to manage and store one or more snapshots of a virtual machine. Each snapshot of the virtual machine may correspond with a point in time version of the virtual machine. The data management system 102 may generate and manage a list of versions for the virtual machine. Each version of the virtual machine may map to or reference one or more chunks and/or one or more files stored within the distributed file system 112. Combined together, the one or more chunks and/or the one or more files stored within the distributed file system 112 may comprise a full image of the version of the virtual machine.

Overview

Figure 1D:
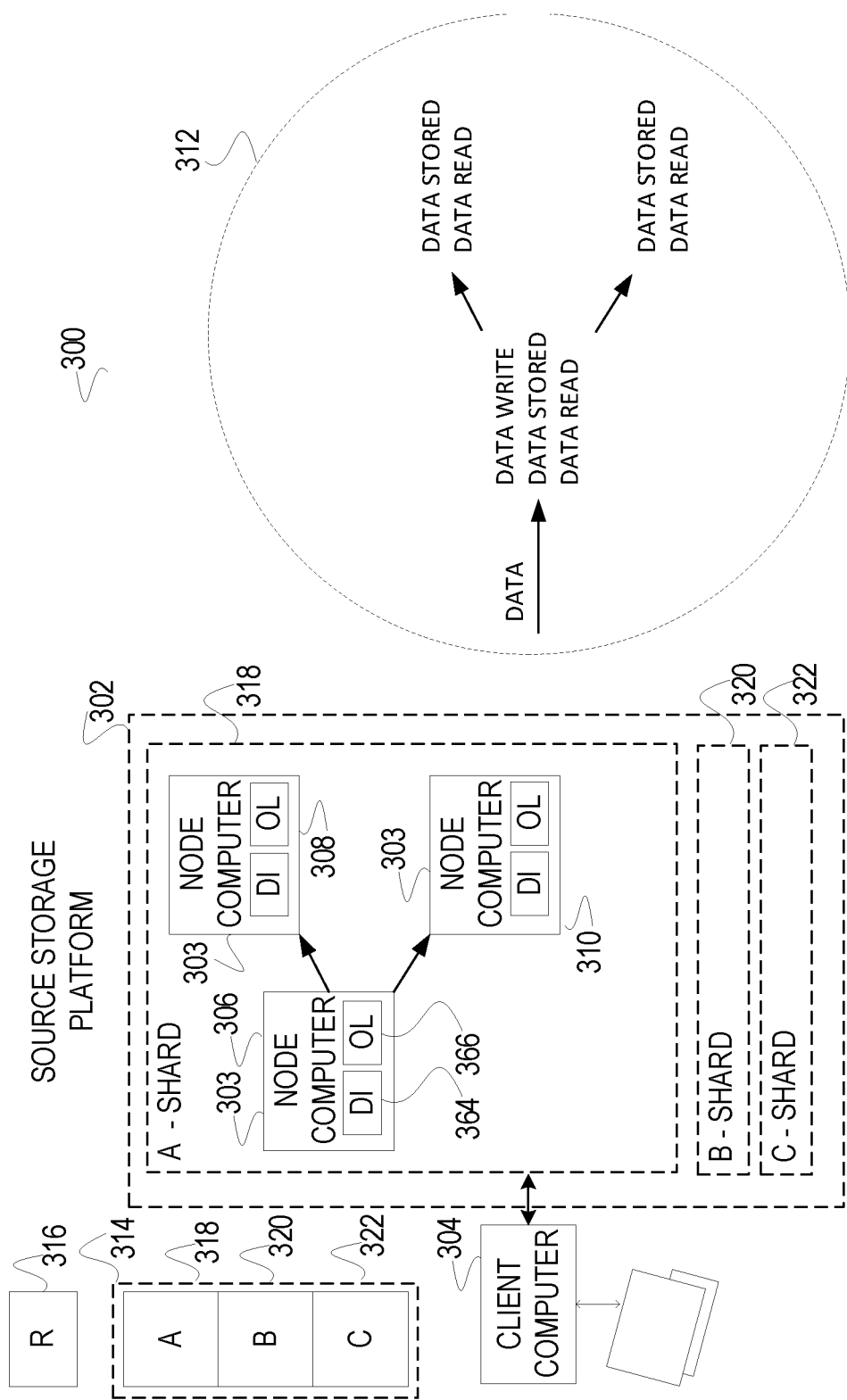
FIG. 1D is a block diagram illustrating a system, according to an embodiment.

FIG. 1D is a block diagram illustrating a system 300, according to an embodiment. The system 300 includes a source storage platform 302 that is locally or remotely communicatively coupled to a client computer 304. For example, the source storage platform 302 may be remotely coupled, over a network (e.g., Internet), to one or more client computers such as client computer 304. The source storage platform 302 may include one or more node computers 303. For example, the source storage platform 302 may include node computer 306, node computer 308, and node computer 310. Other embodiments may include additional or fewer node computers 303. The node computers 306, 308 and 310 are respectively coupled to database hardware including non-volatile memory (not shown) for storing data. The source storage platform 302 may also be referred to as a database cluster, a high availability cluster, fail-over cluster, and the like. Broadly, database clusters are groups of computers that support server applications and are highly reliable. Database clusters utilize high availability software and redundant computers in groups or clusters to provide continued service when system components fail.

Broadly, the system 300 may operate as follows. The client computer 304 may write data to the source storage platform 302 or read data from the source storage platform 302. Data written to the source storage platform 302 may be stored at node computer 303 that, in turn, communicates the data to node computers 308 and 310. Data read from the source storage platform 302 may be read from node computer 306, 308 or 310. The described write/read architecture is further illustrated inside a circle 312. In some embodiments, the node computer 306 may be referred to as a "primary" and the node computer 308 and the node computer 310 as "secondaries." The secondary node computers 308 or 310 may become a "primary" computer responsive to detecting the "primary" node computer 306 failing or becoming unreachable. Each of the node computers 303 includes a data image 364 and an operation log 366, described further later in this document. In addition, each node computer includes a node agent 362 (not shown).

The source storage platform 302 may be utilized to store a database 314 comprised of records 316. The records 316 are distributed over one or more replication sets. Each replication set (e.g., shard) includes a distinct data set. For example, the database 314 may include three shards including shard "A" 318 comprised of records of employees of XYZ Corp. with last names beginning with letters A-J, shard "B" 320, comprised of records of employees of XYZ Corp. with last names beginning with letters K-T, shard "C" 322, comprised of records of employees of XYZ Corp. with last names beginning with letters U-Z. In one embodiment, the records 316 may be documents respectively identified with document identifiers and stored on a Mongodb®, a cross-platform document-oriented database program. For example, the source storage platform 302 may store documents utilizing Mongodb® program and distribute the documents over the shards 318, 320 and 322. The shards 320 and 322 are like shard 318. Accordingly, the shards 320 and 322 may include more or fewer node computers 303 and utilize the same read/write/store architecture as illustrated in circle 312. It is highly desirable to maintain consistency of data between the shards 318, 320 and 322 and within a shard (e.g., between the node computers 306, 308, 310).

FIG. 1E is a block diagram illustrating a system 350, according to an embodiment, to store data on a secondary storage platform 360. The system 350 corresponds to the system 300 in FIG. 1D. Accordingly, the same or similar references have been used to indicate the same or similar features unless otherwise indicated. The system 350 includes the source storage platform 302, on the left, as previously described, and a secondary storage platform 360, on the right. The secondary storage platform 360 may be used to store one or more backup copies of the database 314 that was stored at each of nodes computers 306, 308, 310 (not shown). For example, the database 314 may be stored at the node computers 306, 308, 310 (not shown) in the form of a data image 364 and an operation log 366, as described further below. The data image 364 may be a snapshot in time of the shard. For example, the data image 364 may include a snapshot of all records 316 in the shard 318 at Jan. 28, 2019 at 11PM and the operation log 366 may store operations that have occurred subsequent to the snapshot of the data image 364. Each of the operations includes a timestamp. The operations in the operation log 366 may be sequentially applied to the data image 364 to reconstruct the data image 364 at a time subsequent to its time stamp. For example, a user operating client computer 304 may add a document to the clustered database causing the data image 364 for shard "A" to be updated with the document and an insert operation to added to the operation log 366. Responsive to the update and the addition of the insert operation, the node computer 306 (e.g., primary) (e.g., 306) may communicate the update and the addition to the node computers (e.g., 308, 310) (not shown), as previously described.

Each of the node computers 306, 308, 310 (not shown), at the source storage platform 302, may include node agents 362. The node agents 362 may receive instructions from the secondary storage platform 360 and execute the instructions causing the node agents 362 to continually stream the data image 364 and the operation log 366 to the secondary storage platform 360. The secondary storage platform 360 may receive one or more streams (e.g., data image 364 and/or operation log 366) from each of the three node computers 306, 308, 310 (not shown) and store a copy of the as secondary storage information 368. In addition, the secondary storage platform 360 may periodically version a paired data image 364 and operation log 366 as historical secondary storage information 370. The secondary storage platform 360 may version a data image 364 and one or more operation logs 366 for each of the shards "A," "B," "C." For example, the secondary storage platform 360 may version shard "A" with a data image 364 from node computer 306 and operation logs 366 from node computers 306, 308 and 310. In addition, the secondary storage platform 360 may version a data image 364 and the one or more operation logs 366 in one-hour intervals (e.g., bottom row—1PM, middle row—2PM, top row—3PM). Accordingly, each row includes a data image 364 and one or more operation logs 366 for each of the shards "A," "B," "C." on the source storage platform 302 on an interval boundary.

Figure 1F:
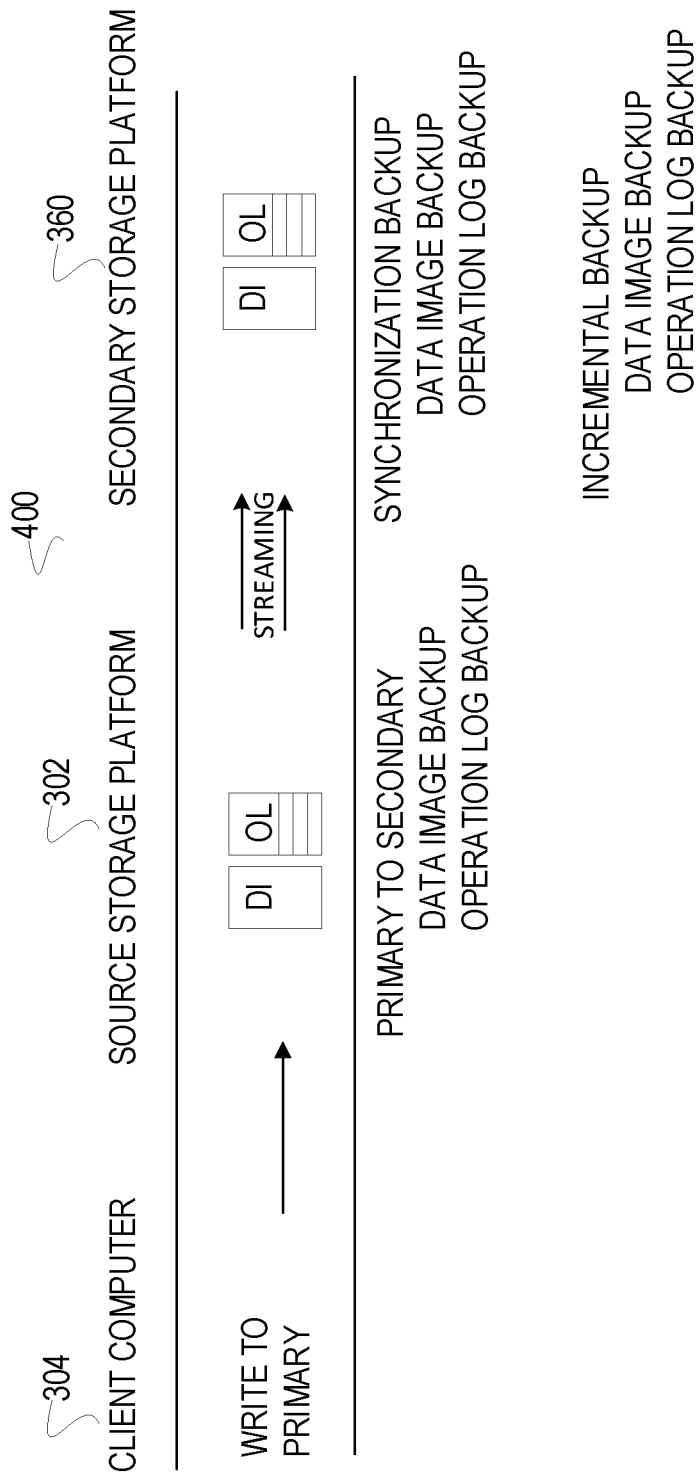
FIG. 1F is a block diagram illustrating an overview, according to an embodiment, of backups.

FIG. 1F is a block diagram illustrating an overview 400, according to an embodiment, of backups. The overview 400 provides an overview of backups that may be processed by the system 350. The system 350 corresponds to the system 300 in FIG. 1D and the system 350 in FIG. 1E. Accordingly, the same or similar references have been used to indicate the same or similar features unless otherwise indicated. Illustrated on the left is a client computer 304. Illustrated in the middle is the source storage platform 302 and illustrated on the right is the secondary storage platform 360.

The backup of data may generally operate as follows. The client computer 304 may receive an update to a document that is communicated over the network to the source storage platform 302 where it is received by a node computer 303 (e.g., primary node computer) (not shown). For example, the client computer 403 may receive a "save" operation to a WORD file causing the text of the WORD file to be communicated over the network to the source storage platform 302. The node computer 303 (e.g., primary node computer), at the source storage platform 302, receives the update and updates the data image 364 and the operation log 366 based on the update. Responsive to receiving and applying the update, the node computer 303 (e.g., primary node computer) backs up or communicates the data image 364 and the operation log 366 to the secondary computer nodes 310 (not shown).

Asynchronous to the above operations, a control computer, at the secondary storage platform 360, may control synchronization backups and incremental backups. The synchronization backup is a version of the data images 364 and the operations logs 366 at the secondary storage platform 360 not snapshotted on an interval boundary. The synchronization backup may be performed responsive to a shard addition or a node addition. Responsive to a shard addition, the control computer may select a single node computer 303 in the shard and communicate a node agent 362 to the node computer 303. The node agent 362 may be configured to extract and stream the data image 364 and the operation log 366 to the secondary storage platform 360. In addition, the control computer communicates node agents 362 to the remaining node computers in the shard. The node agents 362 may be configured to extract and stream the operation log 366 to the secondary storage platform 360. Accordingly, a single data image 364 is maintained for the shard. Further, the control computer timestamps the data image 364 responsive to the identification of the shard addition. Accordingly, a synchronization backup for a shard addition is time-stamped with a time not consistent with the timestamp of the other shards in the clustered database. The timestamp for the shard addition remains inconsistent with the other shards until a version after the backup synchronization completes, as described further in this document.

A synchronization backup may also be performed responsive to the addition of a node computer 303 to an existing shard. Responsive to addition of node computer 303 to an existing shard, the control computer communicates a node agent 362 to the node computer 303, the node agent being configured to extract and stream changes to the operation log 366 to the secondary storage platform. During the synchronization backup, the node computer 303, may also acts as a secondary MongoDB node on the source storage platform 302. In this role, the node computer 303 is simultaneously being synchronized with a primary MongoDB node (e.g., MongdoDB synchronization backup), during which time, no operations are added to the operation log in the node computer 303 (e.g., MongoDB secondary node). Accordingly, the operation log 366 at the secondary storage platform 360 will be missing operations until after the MongoDB synchronization is complete. This is described further in this document.

An incremental backup is a snapshot of the data image 364 taken at a time chronicled by a timestamp marking the beginning of the interval and an operations log comprised of operations that may be applied to the data image after the timestamp. Accordingly, a version of the clustered database may be restored at any point in time from the beginning of an interval to the end of the interval by utilizing the data image 364 and its associated operation log 366.

Processing a Topology Change in a Clustered Database

Figure 1G:
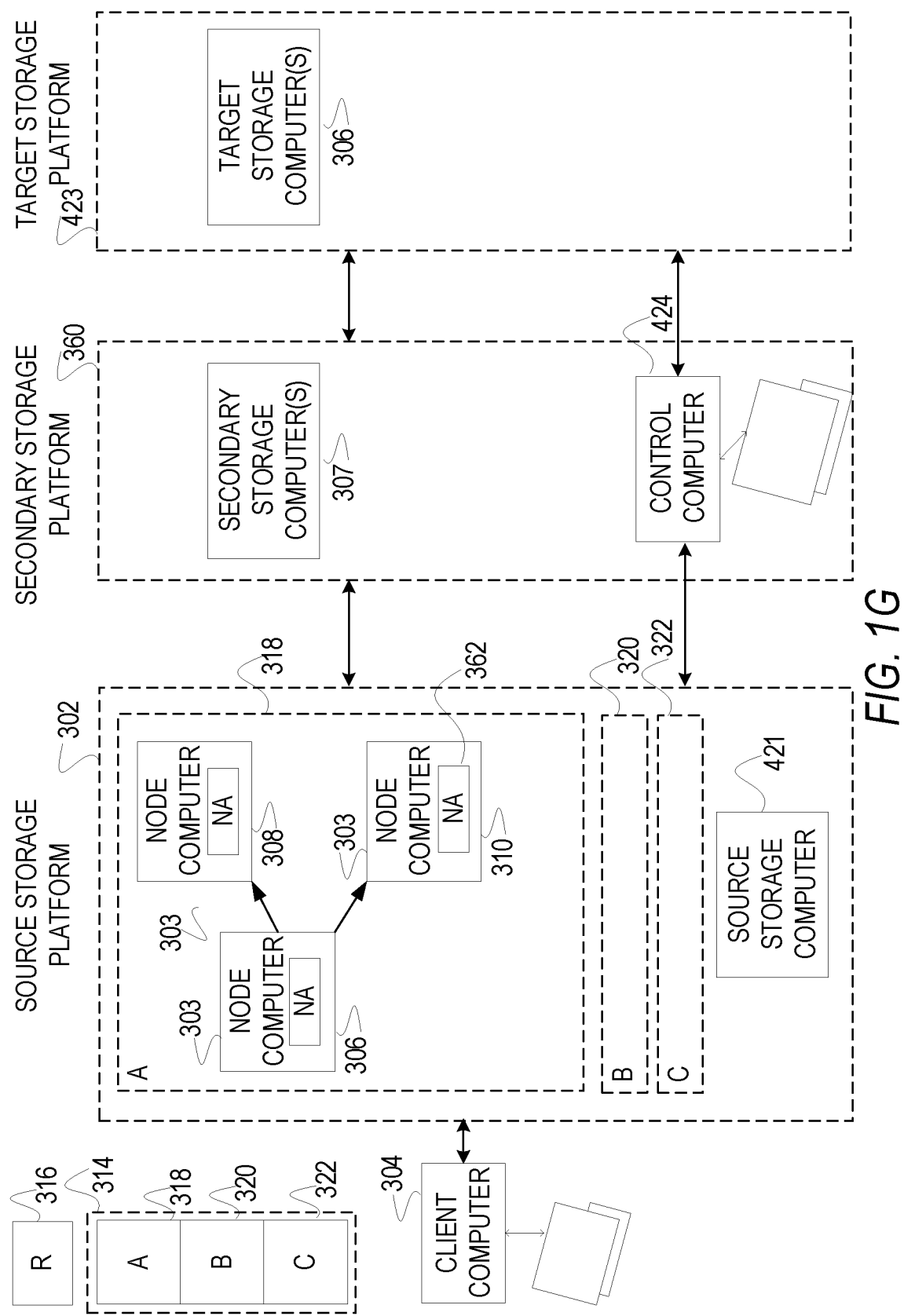
FIG. 1G is a block diagram illustrating a system, according to an embodiment, process a topology change in a clustered database.

FIG. 1G is a block diagram illustrating a system 420, according to an embodiment, to process a topology change in a clustered database. The system 420 corresponds to the system 300 in FIG. 1D and the system 350 in FIG. 1E. Accordingly, the same or similar references have been used to indicate the same or similar features unless otherwise indicated. Illustrated on the left is a client computer 304. Illustrated in the middle in the center left is a source storage platform 302, as previously described, and illustrated in the center right is a secondary storage platform 360, as previously described. Illustrated on the right is a target storage platform 423. The source storage platform 302 is further illustrated to include a source storage computer 421 for controlling the source storage platform 302. The secondary storage platform 360 is further illustrated to include the control computer 424 for controlling the secondary storage platform 360. The control computer 424 may be accessed over a network (e.g., Internet) with a web interface or locally with a monitor connected to the control computer 424.

The target storage platform 423 includes a control computer 424 for controlling the target storage platform 423. Broadly, data flows from left to right. For example, an operation that adds a TEST document to the database 314 may originate at the client computer 304 that communicates the operation, over a network, to the source storage platform 302 that, in turn, stores the TEST document in the form of data images 364 and operations logs 366 at each of the node computers 306, 308 and 310 that, in turn, respectively include node agents 362 that stream the data images 364 and operations logs 366, over a network (e.g., Internet), to the secondary storage computers 307 at the secondary storage platform 360 that, in turn, store versions of the data images 364 and operations logs 366 that may be utilized for restoration of the TEST document to the target storage platform 423. For example, the control computer 424 may be utilized to restore various versions of the TEST document from the secondary storage platform 360 to the target storage platform 423.

The control computer 424 may be utilized to process network topology changes on the source storage platform 302. For example, the control computer 424, at the secondary storage platform 360, may communicate a query requesting a network topology status. In one embodiment, the source storage platform 302 may be executing a Mongodb program and the control computer 424, at the secondary storage platform 360, may be communicating over a network (e.g., Internet) with the Mongodb program. For example, the control computer 424, at the secondary storage platform 360, may communicate a query requesting a network topology status and the source storage computer 421 may respond with a message describing the network topology of the clustered database at the source storage platform 302. The message may include replica set identifiers, node identifiers, and the like. The control computer 424 may utilize the message to identify shard additions, shard removals, node additions, and node removal. In one embodiment, the control computer 424 may respond to a node computer addition at the source storage platform by communicating a node agent 362, over the network, to a node computer 306, for installation and execution on the node computer 303, as previously described. The operation is described in more detail, as follows. First, the control computer 424, at the secondary storage platform, communicates a query, over a network, to the source storage computer at the source storage platform 302. The query enquires of a topology status for a clustered database being hosted by the source storage platform 302. The clustered database includes a data image 364 including a first plurality of documents (e.g., TEST document). Next, the control computer 424, at the secondary storage platform 360, receives a message in the form of a topology message. The topology message includes shard and node identifiers identifying shards and node computers 303 in the clustered database. The control computer 424 utilizes the message to identify a topology change in the clustered database. For example, the control computer 424 may automatically identify an automatic addition of a node computer 303 (e.g., first node) to the clustered database on the source storage platform 302. The control computer 424 may the identify the addition of the node computer 303 by comparing the contents of the message with a status of the network topology that is being maintained at the secondary storage platform 360. Responsive to identifying the addition of the node computer 303, the control computer 424 may initialize the node computer 303. The control computer 424 may initialize the node computer 303 by communicating a node agent 362 (e.g., first node agent) to the node computer 303. Further, control computer 424 may initialize the node computer 303 by configuring the node agent 362 to execute on the node computer 303 to extract the data image 364 and/or operation log 366 being hosted by the node computer 303, at the source storage platform, and stream the data image 364 and/or operation log 366 to a secondary storage computer 307 that is identified by the control computer 424 and hosted on the secondary storage platform 360. According to one embodiment, the secondary storage computer 306 described in this document may be embodied as the storage appliance 170 or the appliance 140, as previously described.

Figure 2A:
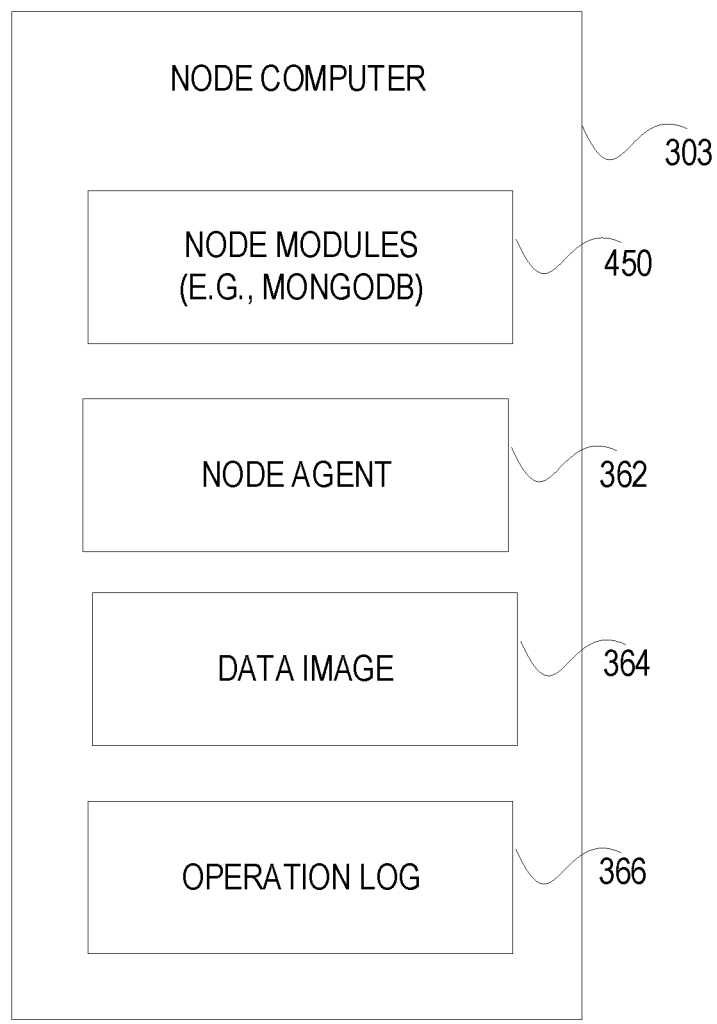
FIG. 2A is a block diagram illustrating node computer, according to an embodiment.

FIG. 2A is a block diagram illustrating a node computer 303, according to an embodiment. The node computer 303 includes node modules (e.g., mongodb modules), the node agent 362, the data image 364, and the operation log 366, as previously described.

Figure 2B:
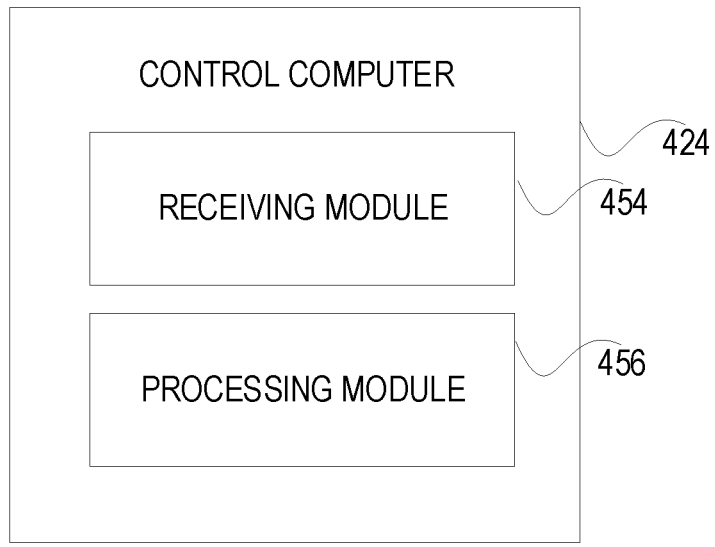
FIG. 2B is a block diagram illustrating control computer, according to an embodiment.

FIG. 2B is a block diagram illustrating a control computer 424, according to an embodiment. The control computer 424 includes a receiving module 454 and a processing module 456. The receiving module 454 may receive commands from a monitor and process the commands. In addition, the receiving module 454 may receive messages and communications from the node computers 303 or the source storage computer 421 at the source storage platform 302. Further, the receiving module 454 may receive messages and communications from the node computers 303 or the source storage computer 421 at the source storage platform 302. Also, the receiving module 454 may receive messages and communications from the target storage computer 306 at the target storage platform 423. The processing module 456 may process the messages, commands, and communications received via the receiving module 454 and communicate reply messages and communications to each of the network entities. In addition, the processing module 456 may perform versioning and network topology monitoring responsive to timeouts expiring.

Figure 2C:
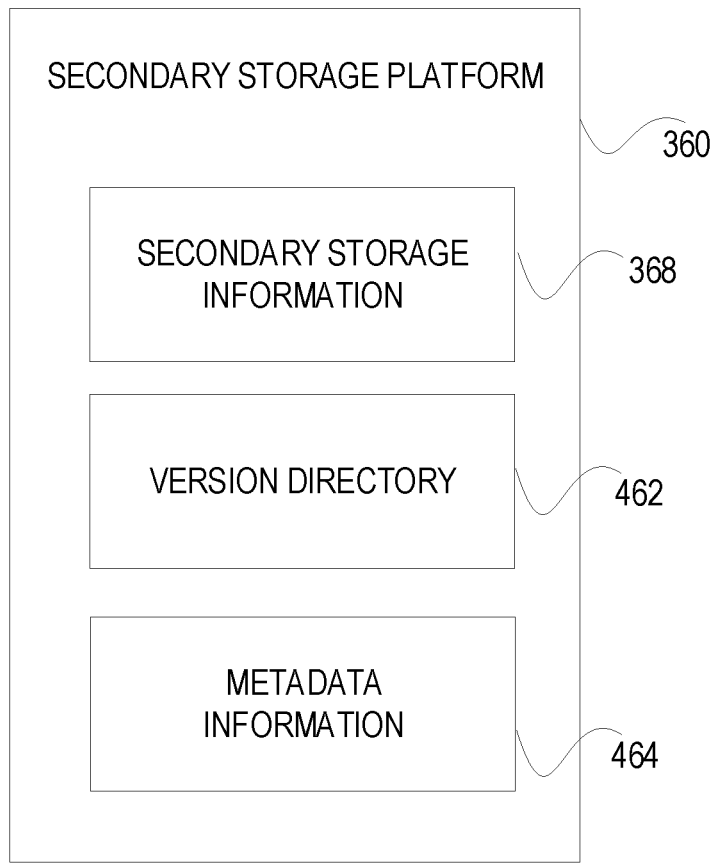
FIG. 2C is a block diagram illustrating secondary storage platform, according to an embodiment.

FIG. 2C is a block diagram illustrating secondary storage platform 360, according to an embodiment. The secondary storage platform 360 may be embodied as Amazon Web Services, a subsidiary of Amazon Inc. that provides on-demand cloud computing platforms to individuals, companies and governments, on a paid subscription basis, located in Seattle, Wash. According to another embodiment, the secondary storage platform 360 may be embodied as Google Cloud Platform, offered by Google Inc. located in Mountain View, Calif. According to another embodiment, the secondary storage platform 360 may be embodied as secondary storage computers 307 operated as a proprietary platform.

The secondary storage platform 360 may store secondary storage information 368, a version directory 462, and metadata information 464. The secondary storage information 368 may stores the data images 364, and the operation logs 366, as previously described. Recall the data images 364, and the operation logs 366 on the secondary storage platform 360 correspond to the data images 364 and operation logs 366 on the source storage platform 302. Further, the operation logs 366 on the secondary storage platform 360 receive the streaming of the data images 364 and operation logs 366 from source storage platform 302. The version directory 462 is utilized to store or version the secondary storage information 368 periodically based on a timeout. The metadata information 464 stores metadata, as described further in this document.

Figure 2D:
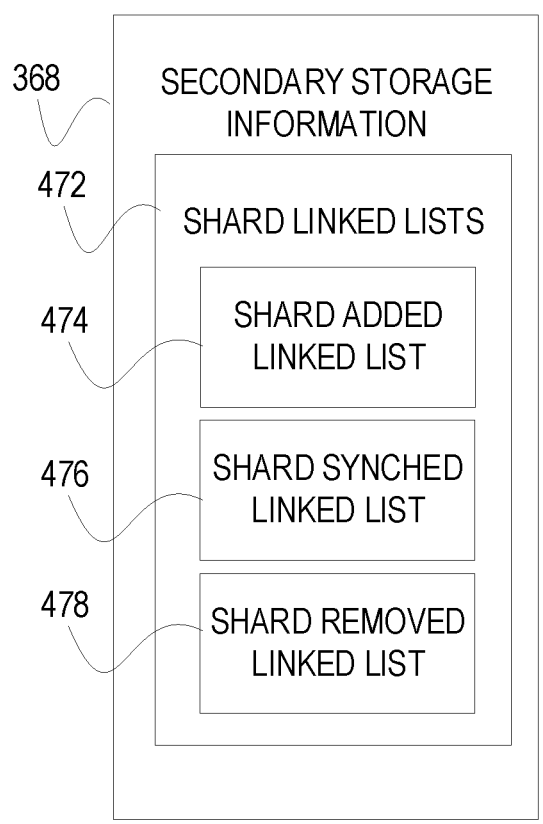
FIG. 2D is a block diagram illustrating secondary storage information, according to an embodiment.

FIG. 2D is a block diagram illustrating secondary storage information 368, according to an embodiment. The secondary storage information 368 may include shard linked lists 472 including a shard added linked list 474, a shard synched linked list 476, and a shard removed linked list 478. The shard linked lists 472 are stored in secondary storage information 368 and facilitate the management of a shard. The shard is described by shard information, a data structure. The shard information may be threaded on to one of the shard linked lists 472.

The shard added linked list 474 may include a pointer to an element of shard information that, in turn, may point to an element of shard information, and so on, forming a linked list of elements of shard information. The element of shard information may be allocated, initialized, and added to the end of the shard added linked list 474 by the processing module 456. The element of shard information is added to the end of the shard added linked list 474 responsive to the processing module 456 identifying a shard being added to the source storage platform 302. For example, the element of shard information may be added to the end of the shard added linked list 474 responsive to the processing module 456 receiving a message from the source storage platform 302 describing the addition of a shard.

The shard synched linked list 476 may include a pointer to shard information that, in turn, may point to shard information, and so on, forming a linked list of shard information elements. A shard information may be moved from the shard added linked list 474 to the end of the shard synched linked list 476 by the processing module 456. The shard information is added to the end of the shard synched linked list 476 responsive to the processing module 456 identifying the shard being registered as synchronized with the source storage platform 302. For example, the shard information is added to the end of the shard synched linked list 476 responsive to the processing module 456 identifying a data image 364 on the secondary storage information 368 has been synchronized with the corresponding data image 364 on the source storage platform 302. This process is described further in this document.

The shard removed linked list 478 may include a pointer to shard information that, in turn, may point to shard information, and so on, forming a linked list of shard information elements. A shard information is moved from the shard added linked list 474 or the shard synched linked list 476 to the end of the shard removed linked list 478 by the processing module 456. The shard information is added to the end of the shard removed linked list 478 responsive to the processing module 456 identifying the shard is removed from the source storage platform 302. For example, the shard information is added to the end of the shard removed linked list 478 responsive to the processing module 456 receiving a message from the source storage platform 302 describing the removal of a shard or removal of all node computers 303 included in the shard.

Figure 2E:
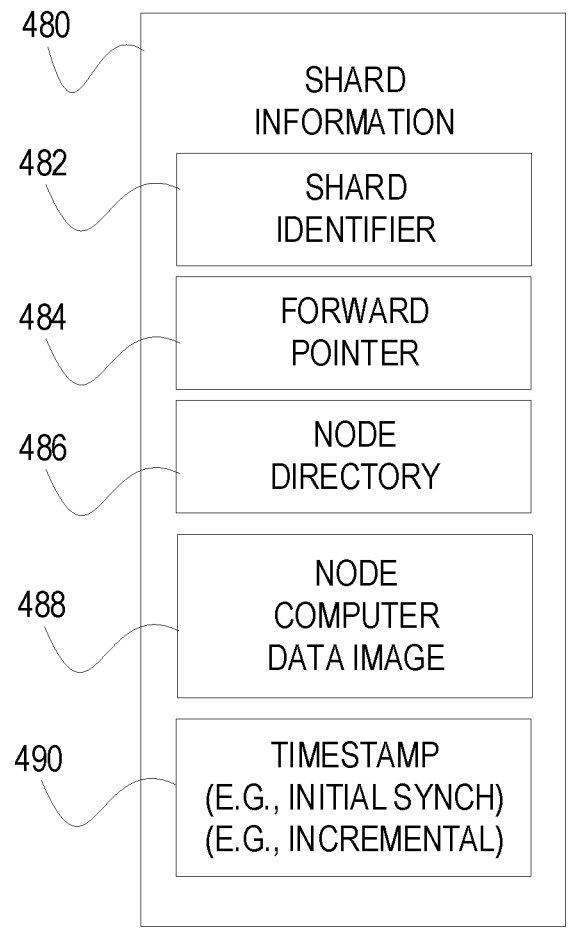
FIG. 2E is a block diagram illustrating shard information, according to an embodiment.

FIG. 2E is a block diagram illustrating shard information 480, according to an embodiment. The shard information 480 describes a shard on the source storage platform 302 that is backed up on the secondary storage platform 360. The shard information 480 is threaded on the shard added linked list 474, the shard synched linked list 476 or the shard removed linked list 478. The shard information 480 may be allocated by the processing module 456 and added to the end of the shard added linked list 474 responsive to the processing module 456 identifying a shard addition to the network topology of the clustered database on the source storage platform 302. Other queue movements are described below. The shard information 480 may include a shard identifier 482, a forward pointer 484, a node directory 486, a node computer data image 488, and a timestamp 490. The shard identifier 482 uniquely identifies the shard. The forward pointer 484 points to the next element of shard information 480 on a linked list 474, 476, or 478. If the element of shard information 480 is the last element then the forward pointer 484 is initialized NULL. The node directory 486 describes node computers 303 associated with the shard. The node computer data image 488 identifies the node computer 303 that is the source of the data image 364 that is utilized to generate backups (e.g., synchronization and incremental) for the shard. The timestamp 490 registers the time of the beginning of the stream for the data image 364 on the secondary storage platform 360. For example, the timestamp 490 may register the time of the beginning of the stream for an initial synchronization backup of the data image 364. Further for example, the timestamp 490 may register beginning of the stream for the incremental backup of the data image 364.

Figure 2F:
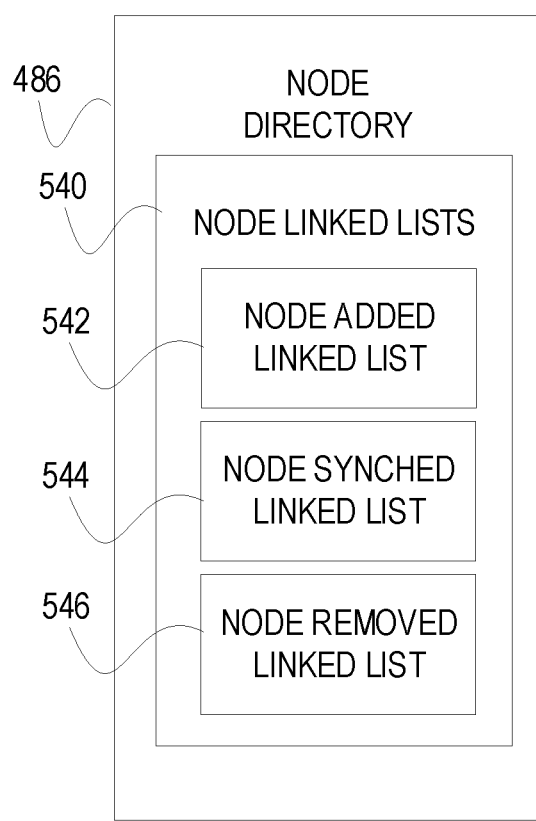
FIG. 2F is a block diagram illustrating a node directory, according to an embodiment.

FIG. 2F is a block diagram illustrating a node directory 486, according to an embodiment. The node directory 486 may include node linked lists 540 including a node added linked list 542, a node synched linked list 544, and a node removed linked list 546. The node linked lists 540 are stored in the secondary storage information 368 and facilitate the management of a node computers 303, described by an element of node information, a data structure that is threaded on to one of the node linked lists 540.

The node added linked list 542 may include a pointer to an element of node information that, in turn, may point to an element of node information, and so on, forming a linked list of elements of node information. The element of node information may be allocated, initialized, and added to the end of the node added linked list 542 by the processing module 456. The node information may be added to the end of the node added linked list 542 responsive to the processing module 456 identifying a node computer 303 being added to the source storage platform 302. For example, the node information may be added to the end of the shard added linked list 474 responsive to the processing module 456 receiving a message from the source storage platform 302 describing the addition of the node computer 310.

The node synched linked list 544 may include a pointer to an element of node information that, in turn, may point to an element of node information, and so on, forming a linked list of elements of node information. An element of node information may be moved from the node added linked list 542 to the end of the node synched linked list 544 by the processing module 456. The element of node information may be added to the end of the node synched linked list 544 responsive to the processing module 456 identifying an operation log 366, on the secondary storage information 368, as being synchronized with the corresponding operation log 366 on the source storage platform 302. This process is described further in this document.

The node removed linked list 546 may include a pointer to an element of node information that, in turn, may point to an element of node information, and so on, forming a linked list of elements of node information. An element of node information may be moved from the node added linked list 542 or the node synched linked list 544 to the end of the node removed linked list 546 by the processing module 456. The element of node information may be added to the end of the node removed linked list 546 responsive to the processing module 456 identifying the corresponding node computer 303 is removed from the source storage platform 302. For example, the element of node information may be added to the end of the node removed linked list 546 responsive to the processing module 456 receiving a message from the source storage platform 302 describing the removal of a corresponding node computer 303.

Figure 2G:
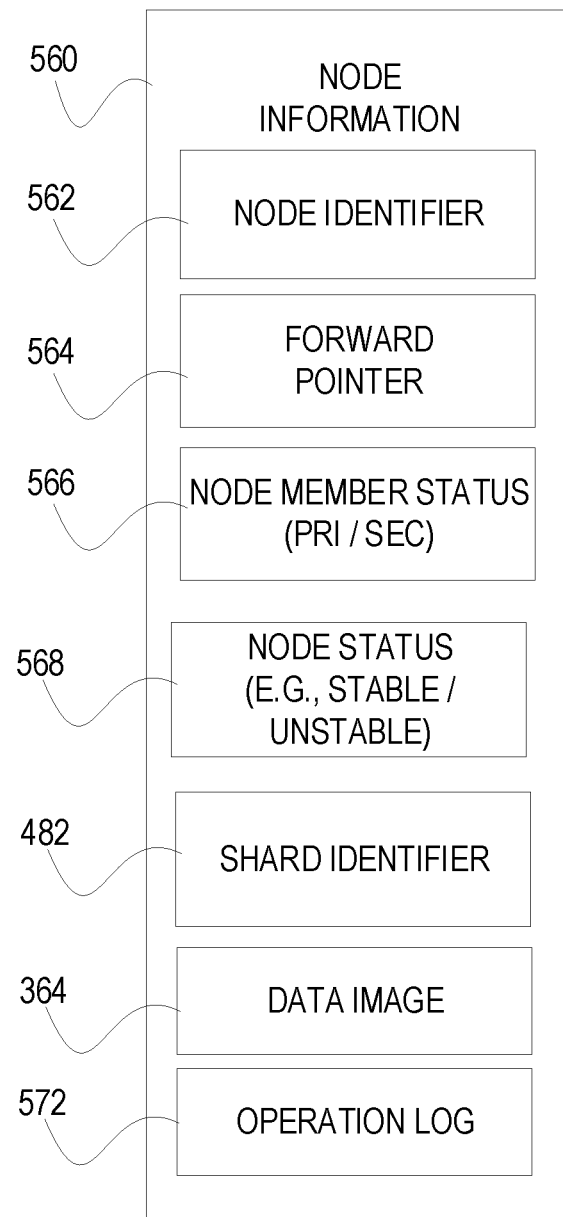
FIG. 2G is a block diagram illustrating node information, according to an embodiment.

FIG. 2G is a block diagram illustrating node information 560, according to an embodiment. The node information 560 describes a node computer 303 on the source storage platform 302 that is backed up on the secondary storage platform 360. The node information 560 is threaded on the node added linked list 542, the node synched linked list 544 or the node removed linked list 546. The node information 560 may be allocated by the processing module 456 and added to the end of the node added linked list 542 responsive to the processing module 456 identifying a node computer 303 being added to the network topology of the clustered database on the source storage platform 302. Other queue movements are described below. The node information 560 may include a node identifier 562, a forward pointer 564, a node member status 566, a node status 568 (E.G., STABLE, UNSTABLE), a shard identifier 482, a data image 364 and an operation log 572. The node identifier 562 uniquely identifies the node computer 303. The forward pointer 564 points to the next element of node information 560 on a linked list 474, 476, or 478. If the element of node information 560 is the last element on the linked list then the forward pointer 564 is initialized NULL. The node member status 566 indicates whether the node computer 303 on the source storage platform is operating as a "primary" or a "secondary" in the database cluster. The shard identifier 482 identifies the shard that the node computer 308 services. The data image 364, in the node information 560, receives the streaming of the data image 364. The node status 568 is initialized to "UNSTABLE" responsive to the corresponding node computer 303 being identified added in a topology message 650 and registered as "STABLE" responsive to identifying an end of file ("EOF") marker in a previous version of the operations log 366. The "STABLE" status signifies the operation log 366 is useable (e.g., synchronization is complete in the previous version). The operation log 572, in the node information 560, receives a stream of the operation log 572 from the node agent 362 at the corresponding node computer 303 on the source storage platform 302.

Figure 2H:
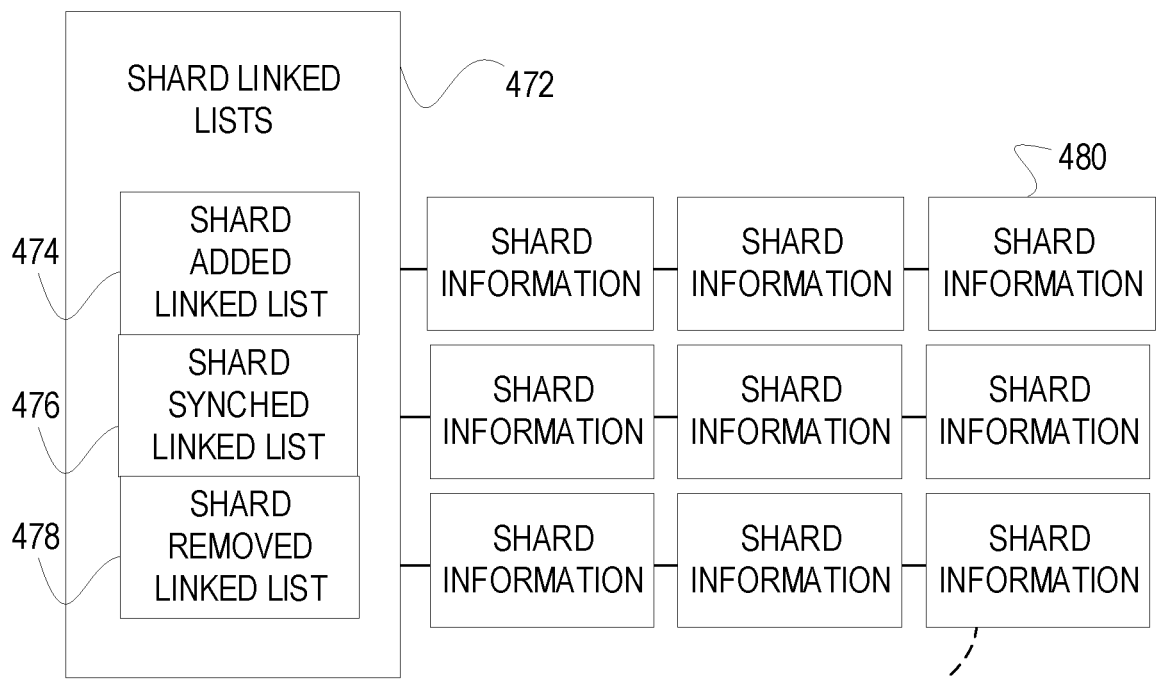
FIG. 2H is a block diagram illustrating shard linked lists, according to an embodiment.

FIG. 2H is a block diagram further illustrating the shard linked lists 472, according to an embodiment. The shard linked lists 472 are illustrated to show multiple elements of shard information 480 on each of the linked lists 474, 476, and 478. The shared removed linked list 478 indicates three shards have been removed and one of the shards is associated with three elements of node information 560 (e.g., corresponding to three node computers 303) that have been automatically identified as removed.

Figure 2I:
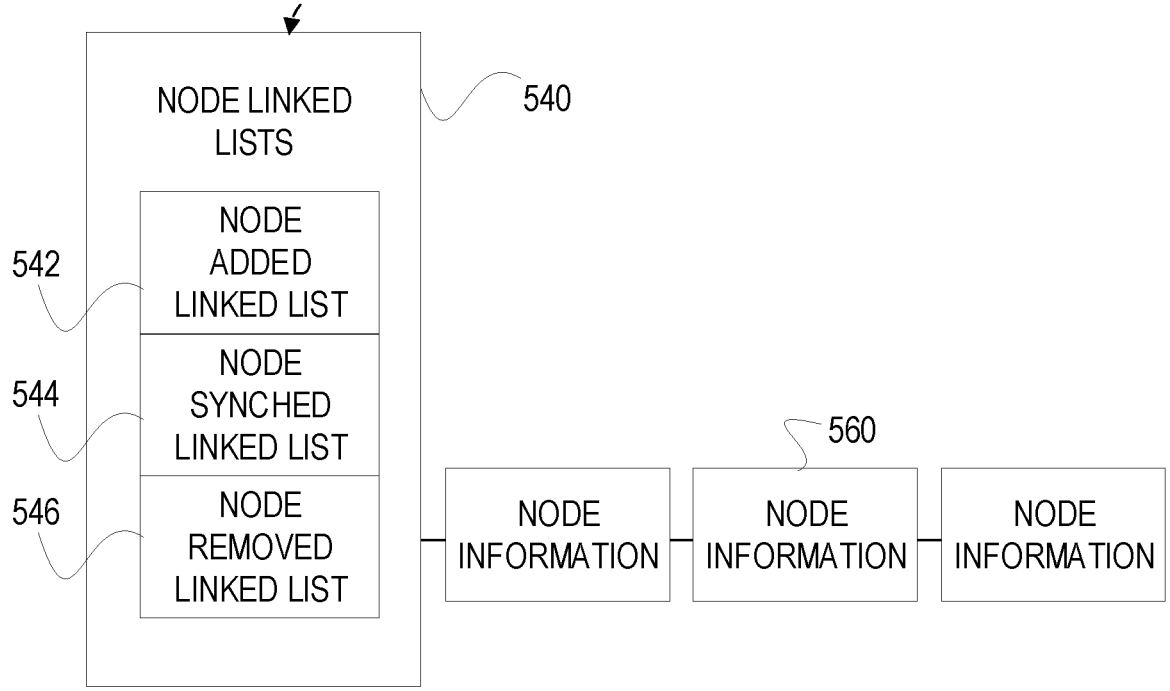
FIG. 2I is a block diagram illustrating node linked lists, according to an embodiment.

FIG. 2I is a block diagram further illustrating the node linked lists 540, according to an embodiment. The node linked lists 540 are illustrated to show three elements of node information 560 on the node removed linked list 546. A dashed arrow illustrates the shard information 480 as pointing to node the linked lists 540 that, in turn, points to node information 560 describing node computers 310 included in the shard.

Figure 2J:
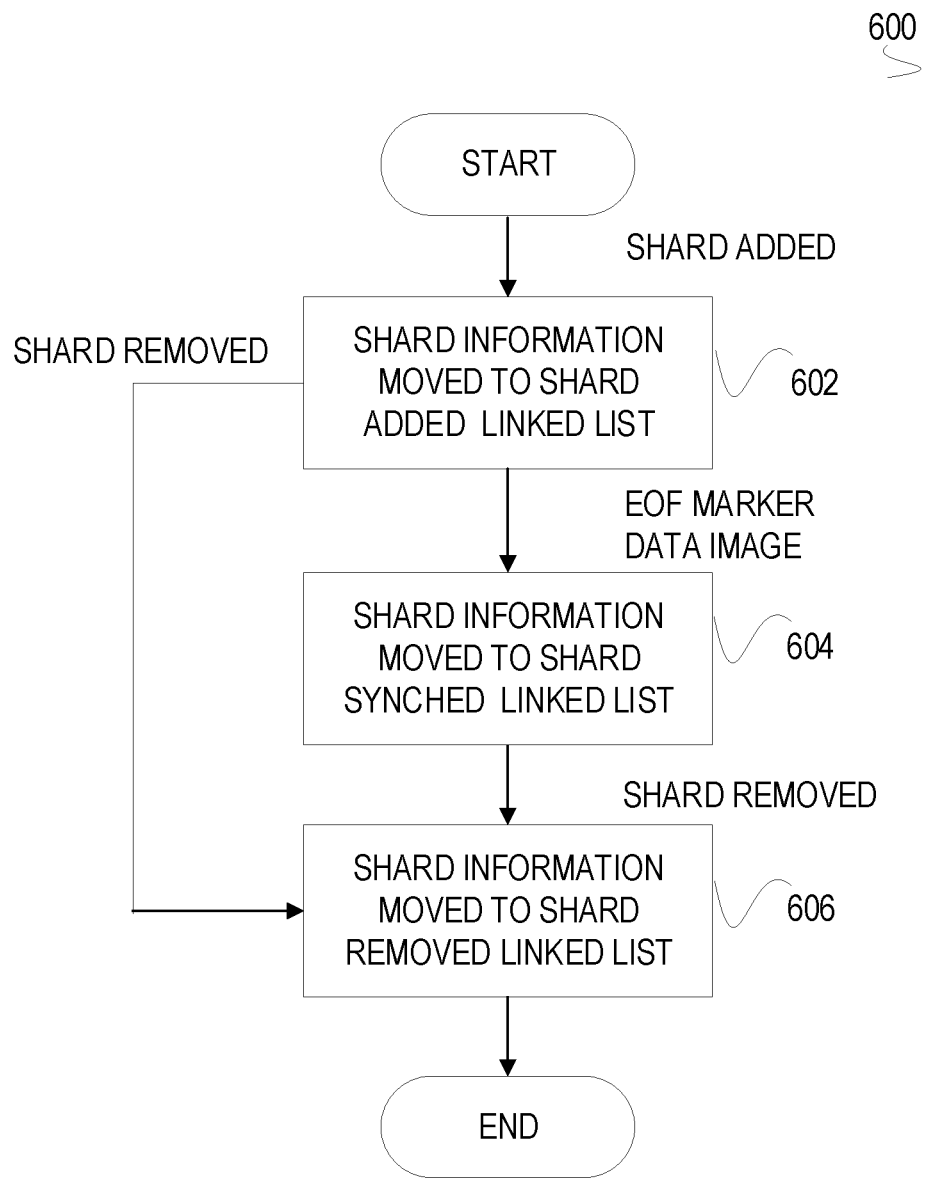
FIG. 2J is a block diagram illustrating operations, according to an embodiment.

FIG. 2J is a block diagram illustrating operations 600, according to an embodiment, to move shard information 480 through linked lists. At operation 602, the processing module 456 allocates and moves an element of shard information 480 to the shard added linked list 474. For example, the processing module 456 may move the shard information 480 to the shard added linked list 474 responsive to the control computer 424 receiving a network topology message indicating a shard was added to the source storage platform 302. At operation 604, the processing module 456 moves the shard information 480 to the shard synched linked list 477 responsive to the processing module 456 identifying an end of file ("EOF") marker in the data image 364 in the node information 560. For example, the processing module 456 may identify an end of file ("EOF") marker in the data image 364 at the completion of a synchronization backup to the secondary storage platform 360. At operation 606, the processing module 456 moves the element of shard information 480 to the shard removed linked list 478. For example, the processing module 456 may move the shard information 480 to the shard removed linked list 478 responsive to the control computer 424 receiving a network topology message indicating a shard was removed from the source storage platform 302 or responsive to the control computer 424 receiving a network topology message indicating the last node computer 303 associated with the shard has been removed.

Figure 2K:
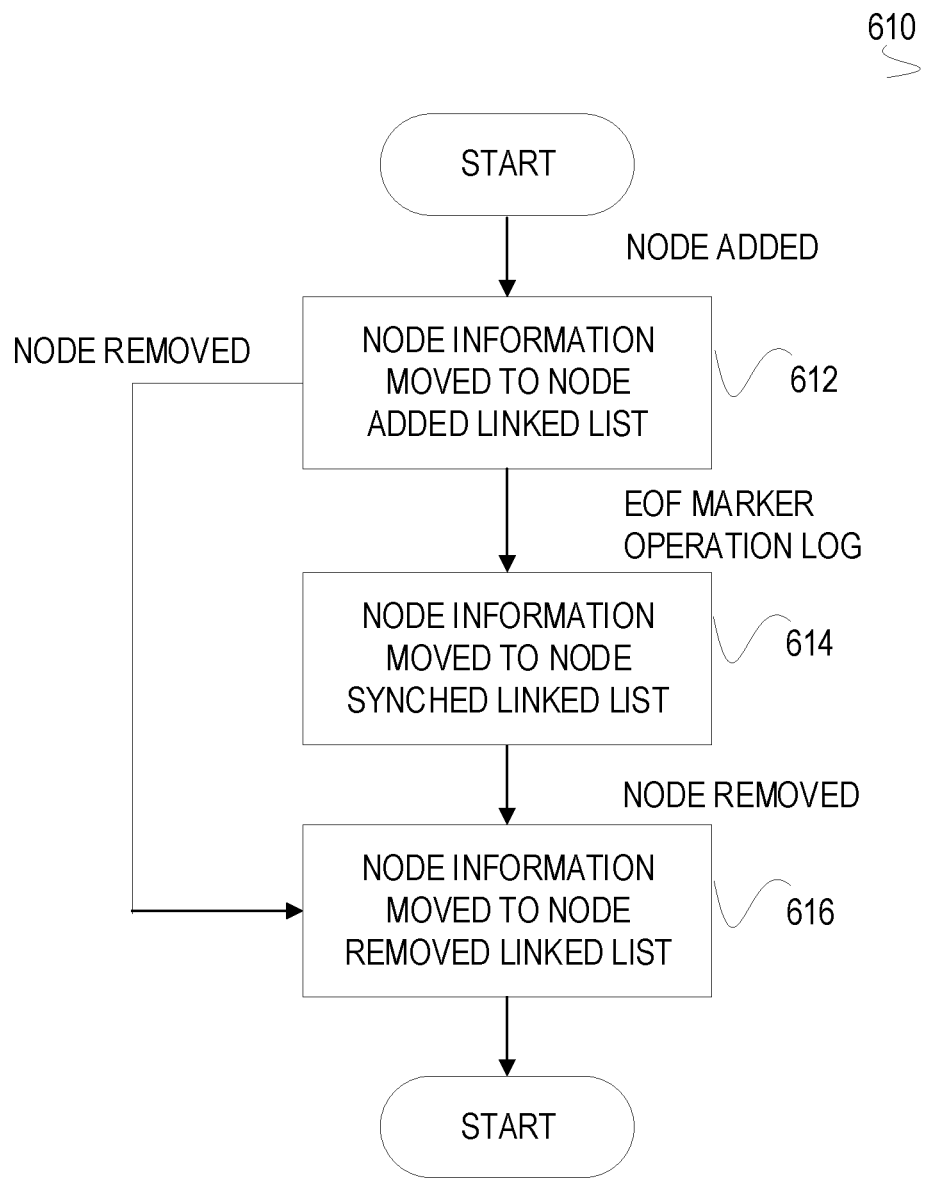
FIG. 2K is a block diagram illustrating operations, according to an embodiment.

FIG. 2K is a block diagram illustrating operations 610, according to an embodiment, to move node information 560 through linked lists. At operation 602, the processing module 456 allocates and moves an element of node information 560 to the node added linked list 542. For example, the processing module 456 may move the node information 560 to the node added linked list 542 responsive to the control computer 424 receiving a network topology message indicating a node computer 303 was added to the source storage platform 302. At operation 614, the processing module 456 moves the element of node information 560 to the node synched linked list 544 responsive to the processing module 456 identifying an end of file ("EOF") marker in the operation log 572 in the node information 560. For example, the processing module 456 may identify an end of file ("EOF") marker in the operation log 572 at the completion of a synchronization backup to the secondary storage platform 360. At operation 616, the processing module 456 moves the element of node information 560 to the node removed linked list 546. For example, the processing module 456 may move the node information 560 to the node removed linked list 546 responsive to the control computer 424 receiving a network topology message indicating a node computer 303, represented by the node information 560, was removed from the source storage platform 302.

Figure 2L:
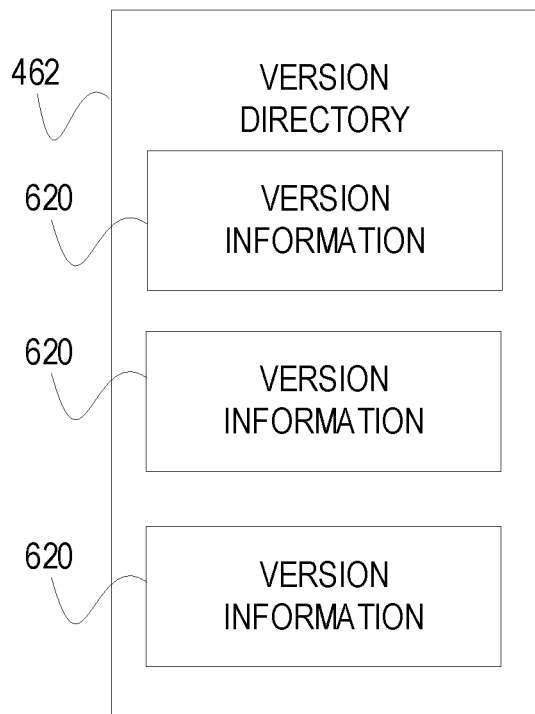
FIG. 2L is a block diagram illustrating a version directory, according to an embodiment.

FIG. 2L is a block diagram illustrating a version directory 462, according to an embodiment. The version directory 462 may be utilized by the processing module 456 to version the clustered database. The version directory 462 stores elements of version information 620. Responsive to the end of an interval, the processing module 456 may store a version of the clustered database in the form of secondary storage information 368.

Figure 2M:
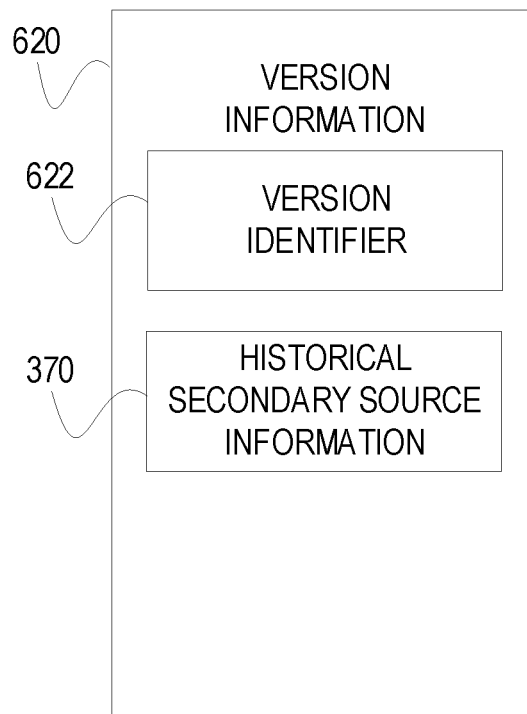
FIG. 2M is a block diagram illustrating a version information, according to an embodiment.

FIG. 2M is a block diagram illustrating version information 620, according to an embodiment. The version information 620 includes a version identifier 622 and historical secondary source information 370. The version identifier uniquely identifiers the version. The historical secondary source information 370 includes a timestamped copy of the secondary storage information 368 (e.g., timestamp 490 included in shard information 480). Consistent shards include the same timestamp 490.

Figure 2N:
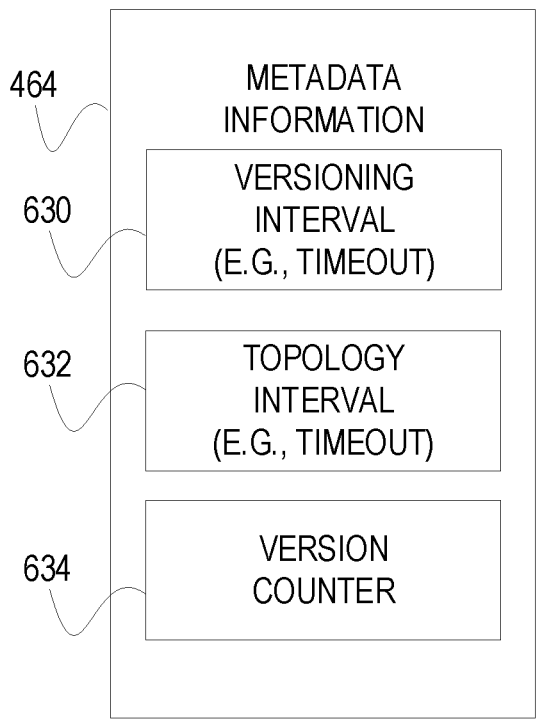
FIG. 2N is a block diagram illustrating a metadata information, according to an embodiment.

FIG. 2N is a block diagram illustrating metadata information 464, according to an embodiment. The metadata information 464 may include a versioning interval 630, a topology interval 632 and a version counter 634. The versioning interval 630 is a configurable quantity of time to wait before storing the next version information 620 in the version directory 662. For example, the versioning interval 630 may be a value of minutes (e.g., 60 minutes per version). The topology interval 632 is a configurable quantify of time to wait between querying the source storage platform for topology information. For example, the source storage platform 302 may respond to the query by communicating a topology message describing the topology of the clustered database. For example, the topology interval 632 may be stored in milliseconds (e.g., 500 milliseconds per query). The version counter 64 may be incremented responsive to the versioning interval 630 expiring and stored in the version identifier 622 in the version information 620.

Figure 3:
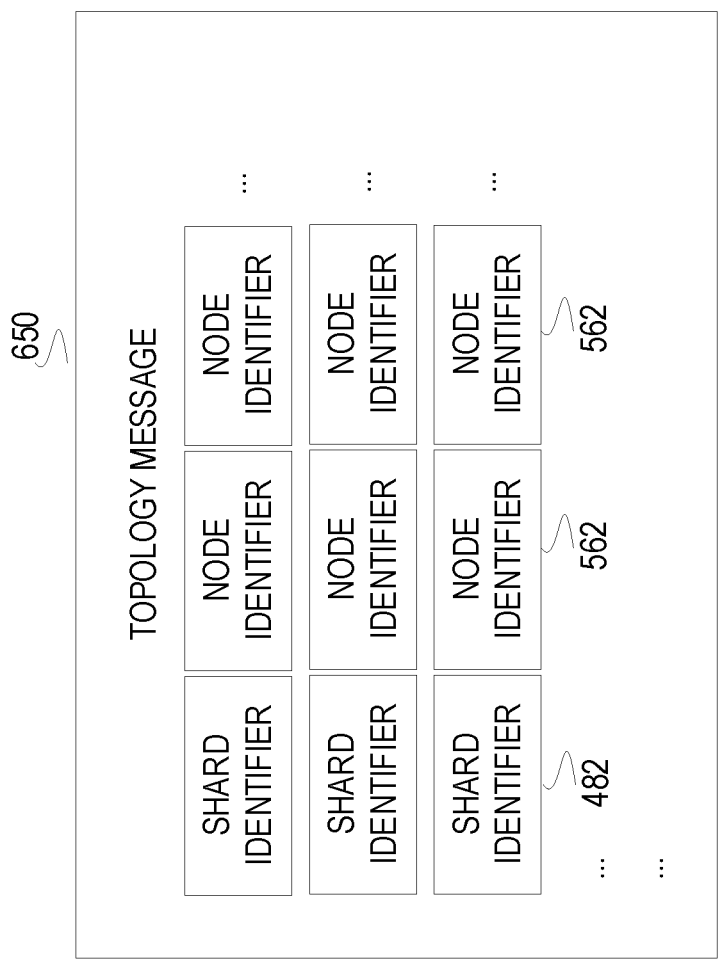
FIG. 3 is a block diagram illustrating a topology message, according to an embodiment.

FIG. 3 is a block diagram illustrating a topology message 650, according to an embodiment. The topology message 650 may include zero or more rows respectively identifying shards. Each row may include a shard identifier identifying a shard and one or more node identifiers 562 identifying node computers 303 included in the shard. The topology message 650 may be communicated to the control computer 424 responsive to the control computer sending a query requesting a network topology status from the source storage platform 302. Each topology message 650 reports the complete topology of the clustered database at the source storage platform 302. Differences between topology messages 650 that are received adjacent in time may indicate additions or deletions from the topology of the clustered database at the source storage platform 302.

Figure 4:
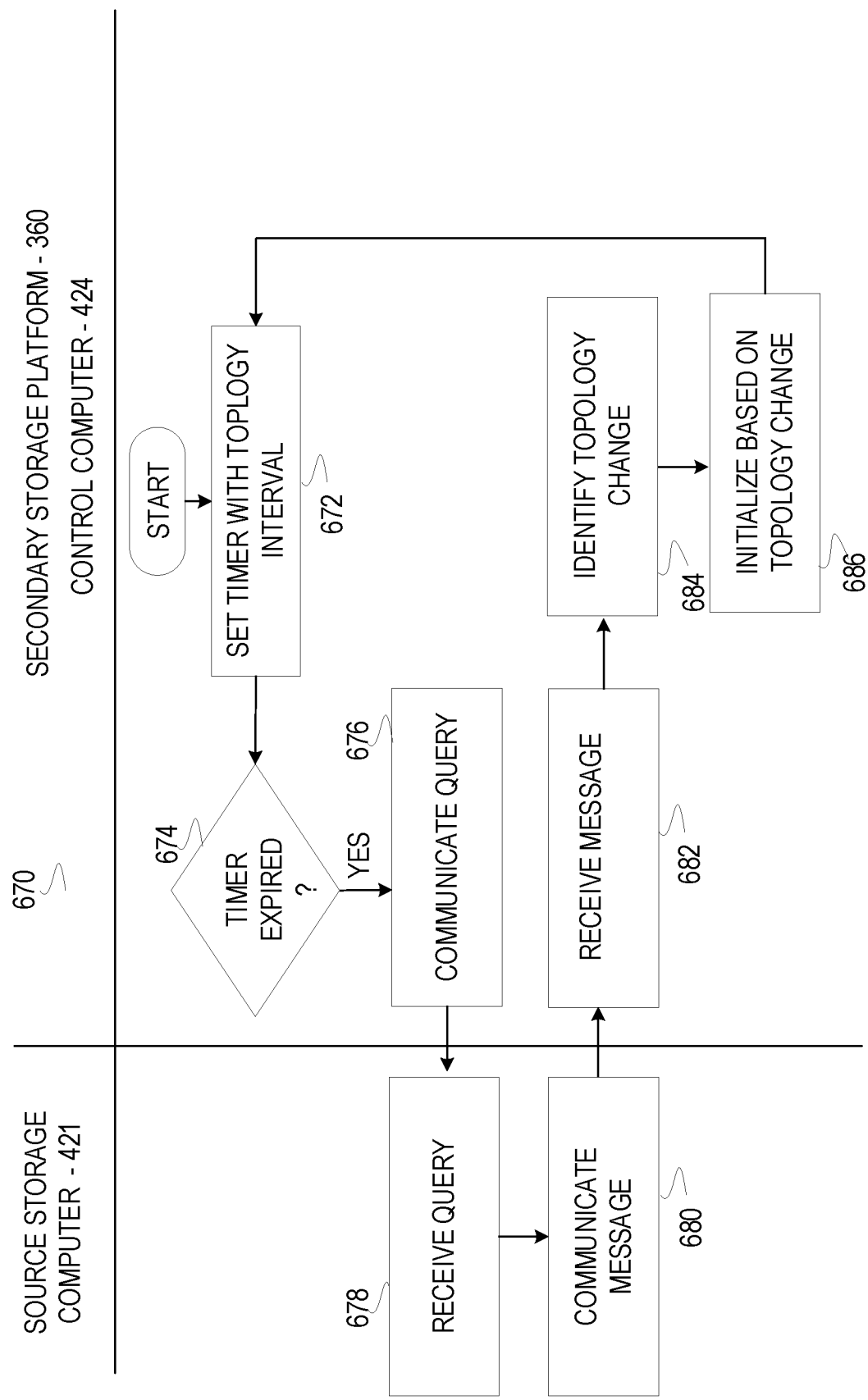
FIG. 4 is a block diagram illustrating a method, according to an embodiment, to process a topology change in a clustered database.

FIG. 4 is a block diagram illustrating a method 670, according to an embodiment, to process a topology change in a clustered database. Illustrated on the left is the source storage computer 421, at the source storage platform 302, and on the right is the control computer 424, at the secondary storage platform 360. The method 670 commences at operation 672, on the secondary storage platform 360, at the control computer 424, with the processing module 456 setting a timer with the topology interval 632.

At decision operation 674, the processing module 456 identifies whether the timer has expired. If the timer has expired, processing continues at operation 676. Otherwise, processing continues at decision operation 674.

At operation 676, the processing module 456 communicates a query to the source storage platform 302. The query is a request for a status of topology of the clustered database at the source storage platform 302.

At operation 678, the source storage computer 421, at the source storage platform 302, receives the query and at operation 680, the source storage computer 421 communicates the topology message 650 to the control computer 424.

At operation 682, at the secondary storage platform 360, the receiving module 454, receives the topology message 650 and at operation 684, the processing module 456 identifies whether a topology change has occurred. The processing module 456 may process the topology message 650 to identify one or more shard additions, one or more shard removals, one or more node computer 303 additions and one or more node computer 303 removals. For example, the processing module 456 may compare the shard identifiers 482 in the topology message 650 with the shard identifiers 482 in shard information 480 elements in the secondary storage information 368 to identify changes in shards on the source storage platform 302. Further for example, the processing module 456 may compare the node identifiers 562 in the topology message with the node identifiers 562 in node information 560 elements in the secondary storage information 368 to identify changes in node computers on the source storage platform 302.

At operation 686, at the secondary storage platform 360, the processing module 456 performs initializations responsive to the identified topology changes. For example, the processing module 456 may performs initializations as described in association with FIG. 5A.

Figure 5A:
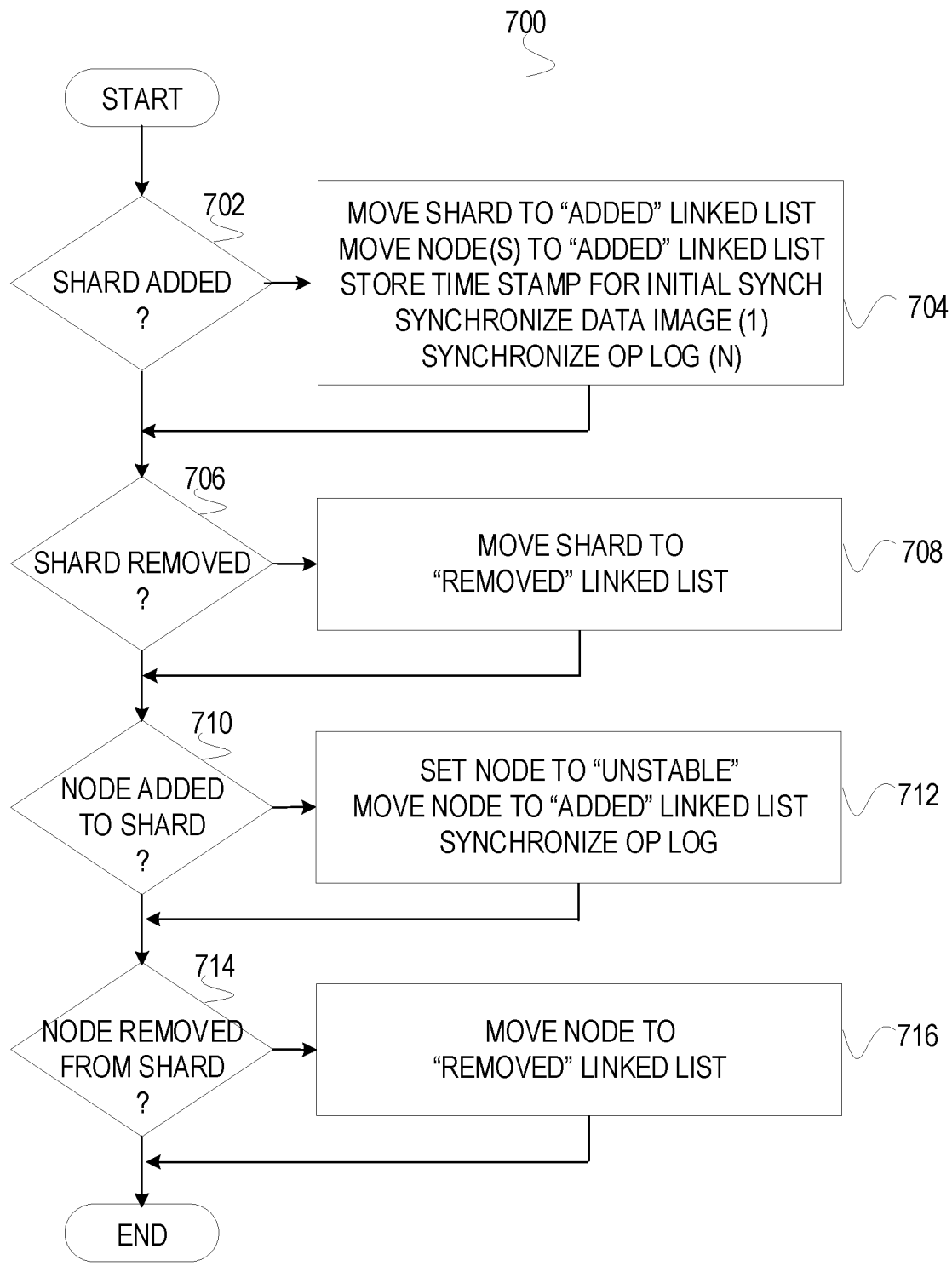
FIG. 5A is a block diagram illustrating a method, according to an embodiment, to initialize based on a topology change in a clustered database.

FIG. 5A is a block diagram illustrating a method 700, according to an embodiment, to initialize based on a topology change in a clustered database. The method commences at decision operation 702, at the secondary storage platform 360, with the processing module 456 identifying whether at least one shard addition should be processed based on the topology change message 650. If the topology message 650 in operation 684 on FIG. 4A indicates one or more shards have been added, then a branch is made to operation 704. Otherwise, a branch is made to decision operation 706.

At operation 704, the processing module 456 performs the following steps for each shard addition. 1) The processing module 456 allocates and initializes shard information 480 including moving the shard information 480 to the shard added linked list 474. 2) The processing module 456 allocates and initializes node information 560 including moving the shard information 480 to the node added linked list 542. 3) The processing module 456 selects a node computer 303 from the shard as a source for the data image 364. 4) The processing module 456 configures and communicates a node agent 362 to the node computer 303 instructing the node agent 362 to stream the data image 364 and the operation log 366 to the secondary storage platform 360, as further described in association with FIG. 5B. The processing module 456 timestamps the initialization of a synchronization backup by writing the current time into the timestamp 490 in the shard information 480. 5) The processing module 456 configures and communicates a node agent 362 to the remaining node computers 303 in the shard instructing each of the node agents 362 to stream the operation log 366 to the secondary storage platform 360, as further described in association with FIG. 5B.

At decision operation 706, the processing module 456 identifies whether at least one shard removal should be processed. If the topology message 650 in operation 684 on FIG. 4A indicates one or more shards were removed, then a branch is made to operation 708. Otherwise, a branch is made to decision operation 710.

At operation 708, the processing module 456 performs the following for each shard removed. 1) The processing module 456 moves the shard information 480 for the removed shard to the shard removed linked list 478.

At decision operation 710, the processing module 456 identifies whether a node computer 303 was added to an existing shard. If the topology message 650 in operation 684 on FIG. 4A indicates one or more node computers 303 were added to an existing shard, then a branch is made to operation 712. Otherwise, a branch is made to decision operation 714.

At operation 712, the processing module 456 performs the following steps for each node computer 310 addition. 1) The processing module 456 registers the node status 568 in the corresponding node status 568 as "UNSTABLE" indicating the operation log 366 is not useable, as explained further in this document. 2) The processing module 456 configures and communicates a node agent 362 to the node computer 303 instructing the node agent 362 to stream changes to the operation log 366 to the secondary storage platform 360, as further described in association with FIG. 5B.

At decision operation 714, the processing module 456 identifies whether at least one node computer 303 was removed. If the topology message 650 in operation 684 on FIG. 4A indicates one or more node computers 303 were removed, then a branch is made to operation 716.

At operation 716, the processing module 456 performs the following steps for each node computer 310 removal. 1) The processing module 456 moves the node information 560 for the node computer 310 to the node removed linked list 546.

FIG. 5B is a block diagram illustrating a method 740, according to an embodiment, to configure and communicate a node agent 362. Illustrated on the left is the node computer 303, at the source storage platform 302, and on the right is a secondary storage computer 307, at the secondary storage platform 360. The method 740 commences at operation 742, on the secondary storage platform 360, at the control computer 424, with the processing module 456 configuring and communicating a node agent 362 to an identified node computer 303 on the source storage platform 302.

At operation 744, at the source storage platform 302, the node computer 303 receives the node agent 362. In some embodiments, the node agent 362 is received preconfigured. In other embodiments, the node agent 362 is received with configuration information that may be applied to the node agent 362. In some embodiments, the node agent 362 may receive configuration instructions, over the network, from the secondary storage computer 306 at a time that is subsequent to installation and launching of the node agent 362 on the node computer 303.

At operation 746, the node computer 303 installs and launches the node agent 362. At operation 748, the node agent 362 executes to stream as configured. For example, if the node agent 362 is configured to stream the operation log 366 then operations 750, 752 and 754 are performed. If the node agent 362 is configured to stream the data image 364 then operations 756, 758 and 760 are performed. If the node agent 362 is configured to stream both the operations log 366 and the data image 364 then both sets of operations are performed including operations 750, 752, 754 and operations 756, 758 and 760.

At operation 750, the node computer 303 extracts and streams the operation log 366 to an identified secondary storage computer 307 at the secondary storage platform 360. For example, responsive to the node computer 303 identifying a portion of the operation log 366, at the node computer 303, that has not been extracted, the node computer 303 extracts and streams the identified portion of the operation log 366 to the identified secondary storage computer 307.

At operation 752, the secondary storage computer 307, at the secondary storage platform 360, may receive the stream of the operation log 366. For example, the stream of the operation log 366 may include one or more discrete operations performed on a document.

At operation 754, the secondary storage computer 307 stores the stream of the operation log 366 into the operation log 366, at the secondary storage computer 307. Note that an initial extraction and streaming of the operation log 366 may be identified as complete by receiving an end of file ("EOF") marker that is stored in the operation log 366, at the secondary storage computer 307, as secondary storage information 368.

At operation 756, the node computer 303 extracts and streams the data image 364 to an identified secondary storage computer 307, at the secondary storage platform 360. For example, responsive to the node computer 303 identifying a portion of the data image 364, at the node computer 303, that has not been extracted, the node computer 303 extracts and streams the portion of the data image 364 to the identified secondary storage computer 307, at the secondary storage platform 360.

At operation 758, the secondary storage computer 307, at the secondary storage platform 360, may receive the stream of the data image 364. For example, the stream of the data image 364 may include changes to an image of a document.

At operation 760, the secondary storage computer 307 stores the stream of the data image 364 into the data image 364, at the secondary storage computer 307, as secondary storage information 368. Note that an initial extraction and streaming of the data image 364 may be identified as complete by receiving an end of file ("EOF") marker that is stored in the into the data image 364, at the secondary storage computer 307, as secondary storage information 368.

Node Consistency in a Clustered Database

Figure 6A:
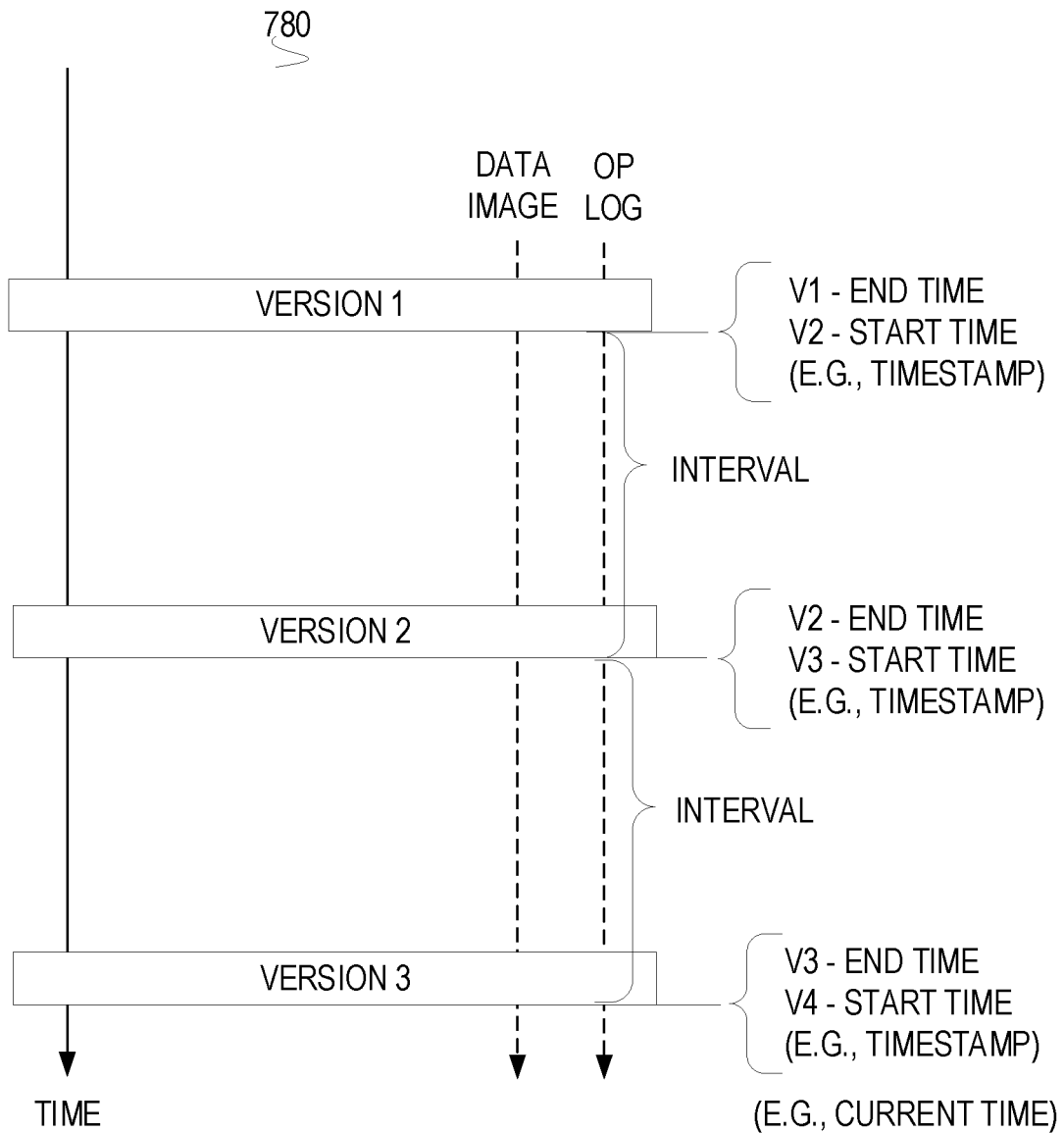
FIG. 6A is a block diagram illustrating versioning, according to an embodiment.

FIG. 6A is a block diagram illustrating versioning 780, according to an embodiment. The versioning 780 is a normative example of versioning. Illustrated from top to bottom are three versions, "VERSION 1," "VERSION 2," and "VERSION 3" in a time sequence moving from earlier time to later time (e.g., "VERSION 1" at 1PM, "VERSION 2" at 2PM, "VERSION 3" at 3PM, and so on). A version of a stream of the data image 364 and the stream of an operation log 366 is located above the version name, "VERSION 1," "VERSION 2," or "VERSION 3." Two vertical dashed lines signify streams being received in the secondary storage information 368. The dashed line on the left signifies a streaming data image 364 and the dashed line on the right signifies a streaming operation log 366.

A version is generated by processing module 456 responsive to the expiration (e.g., timeout) of a versioning interval 630. Responsive to the timeout, the processing module 456, stores the current time as a timestamp 490 in each shard information 480 identified in the shard synched list 476 with an "EOF" marker found in the data image 364 for the shard in the previous version of the clustered database. The timestamp 490 signifies a severing of the streams of data images 364 and operation logs 366 (e.g., above the version name) that are being received from node agents 362 at the source storage platform 302. The processing module 456 snapshots the severed portion by storing the data images 364 and the operation logs 366, in the secondary storage information 368, as historical secondary source information 370. It should be noted that historical secondary source information 370 includes the shard linked lists 472 including linked elements of shard information 480 and the node linked lists 540 including linked elements of node information 560. Accordingly, the versioned historical secondary source information 370 includes the status of a data image 364 and the status of an operation log 366. For example, a specified version of the historical secondary source information 370 may be queried to determine whether a shard was synchronized. In this first example, the query may include a search of the data image 364 in historical storage information to determine whether an end of file ("EOF") marker is found, indicating the synchronization backup was completed for the shard. Further for example, a specified version of the historical secondary source information 370 may be queried to determine whether a node computer 303 was synchronized. In this second example, the query may include a search of the operation log 366 in historical secondary source information 370 to determine whether an end of file ("EOF")

marker is found, indicating the synchronization backup was completed for the node computer 303.

Figure 6B:
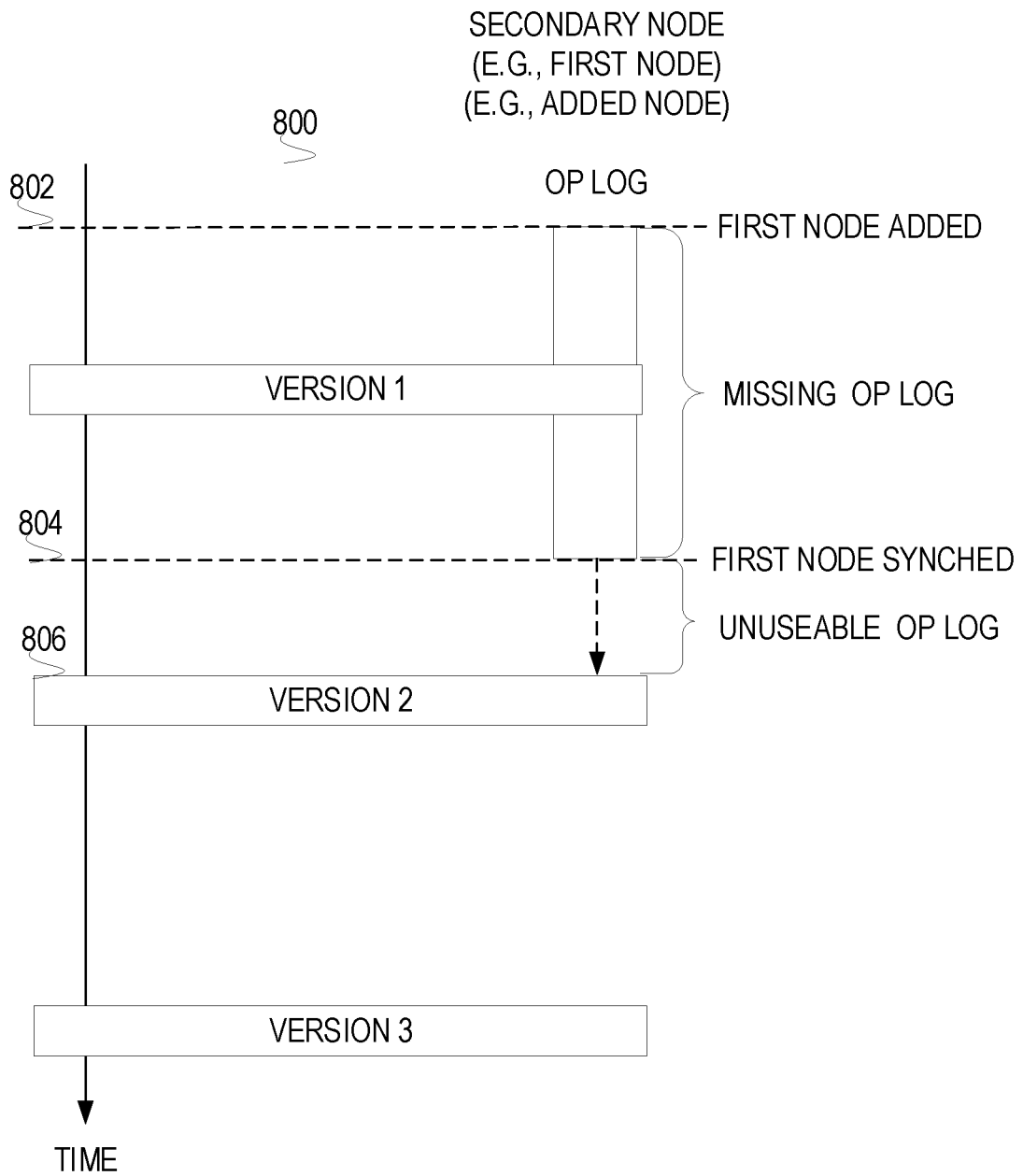
FIG. 6B is a block diagram illustrating a technical problem, according to an embodiment.

FIG. 6B is a block diagram illustrating a technical problem 800, according to an embodiment. The technical problem 800 illustrates problem associated with a synchronization backup of a node computer 303 that was added to a shard. As in FIG. 6A, illustrated from top to bottom are three versions, "VERSION 1," "VERSION 2," and "VERSION 3" in a time sequence moving from earlier time to later time (e.g., "VERSION 1" at 1PM, "VERSION 2" at 2PM, "VERSION 3" at 3PM, and so on). The time axis includes time 802, time 804, and time 806.

At time 802, the control computer 424 receives a topology message 650 indicating a node computer 303 was added on the source storage platform 302 and initializes the node computer 303 with a node agent 362 that is enabled to begin streaming the operation log 366 to the secondary source platform 360. Nevertheless, between time 802 and 804, the operation log 366 for the node computer 303 is missing. The operation log 366 is missing because the node computer 303 (e.g., secondary computer) that was identified as being added on the source storage platform 302 is being synchronized by primary node computer 303 by MongoDB and during this MongoDB synchronization the secondary node computer 303 does not communicate operation log 366 to the secondary storage platform. Accordingly, the operation log 366 for the node computer 303 for "VERSION 1" and "VERSION 2" is associated with problems. "VERSION 1" is problematic because no operation logs 366 are available notwithstanding the node computer 303 being registered as added. "VERSION 2" is problematic because the operation logs 366 that is available between time 804 and time 806 is incomplete. For example, complete operation log 366 (e.g., one that includes operations for the entire interval) may be identified in association with other node computers 303 that are part of the shard.

Figure 6C:
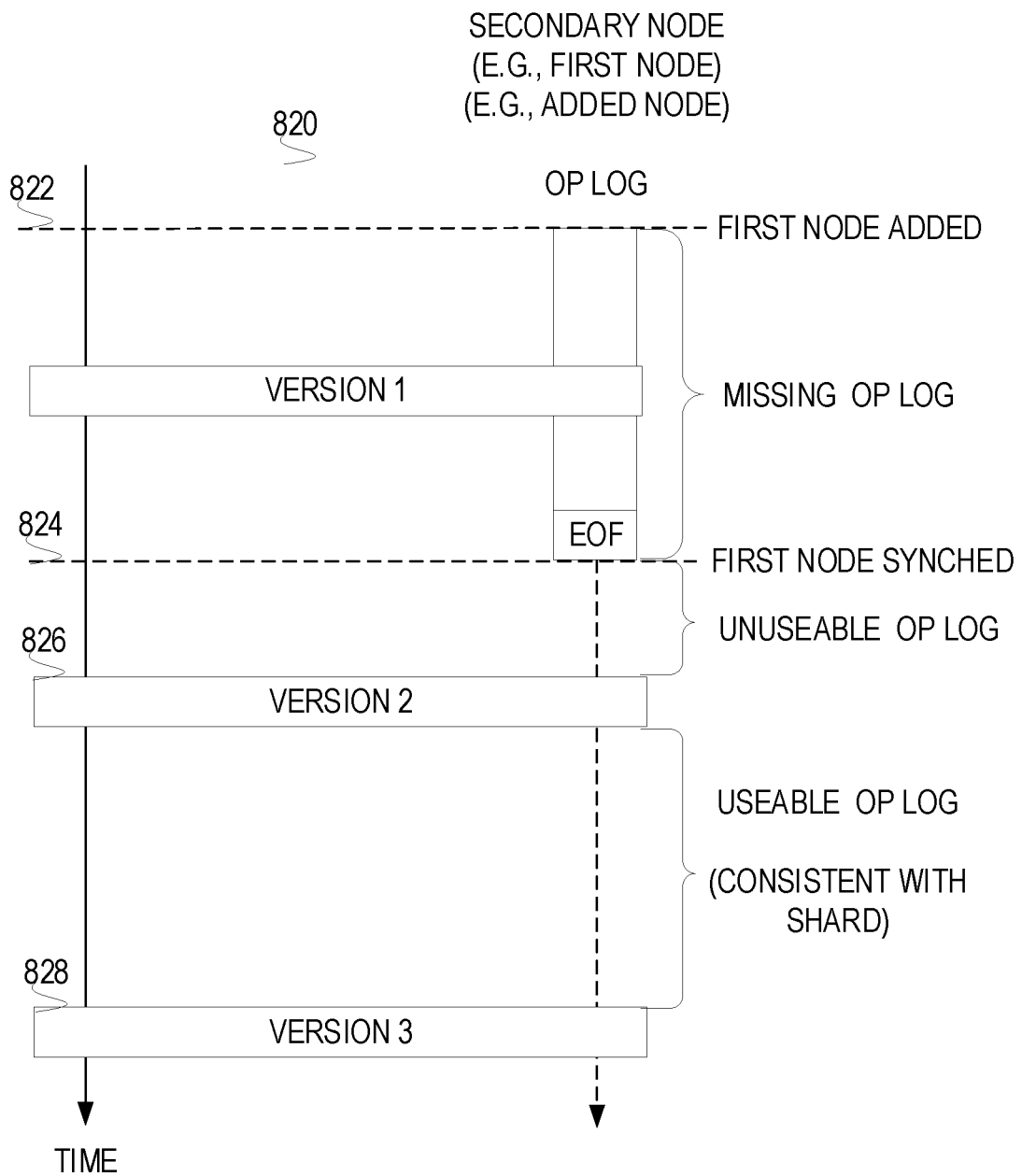
FIG. 6C is a block diagram illustrating a technical solution, according to an embodiment.

FIG. 6C is a block diagram illustrating a technical solution 820, according to an embodiment. The technical solution 820 is one solution to the technical problem 800. As in FIG. 6A, illustrated from top to bottom are three versions, "VERSION 1," "VERSION 2," and "VERSION 3" in a time sequence moving from earlier time to later time (e.g., "VERSION 1" at 1PM, "VERSION 2" at 2PM, "VERSION 3" at 3PM, and so on). The technical solution 820 is described in association with time 822, time 824, 826, and time 828 on the time axis. The technical solution 820 identifies a useable operation log 366 in association with a version. A useable operation log 366 is advantageous because it may be applied to the corresponding data image 364 for the shard. For example, a useable operation log 366 may be utilized for recovery purposes. An operation log 366 may be identified as useable responsive to identifying an end of file ("EOF") marker in the operation log 366 in the previous version. For example, at time 822, the control computer 424 receives a topology message 650 indicating a node computer 303 was added on the source storage platform 302. Between time 822 and time 824, the operation log 366 for the node computer 303 is missing, as previously described. At time 824, an end of file ("EOF") marker is written into the operation log 366 as part of the stream of the operation log 366 being received in the node information 560 in secondary storage information 368 on the secondary platform 350. This signifies the MongoDB synchronization at the source storage platform 302 has completed and the operation log 366 is being communicated, as indicated between time 824 and time 826. The solution to the technical problem 800 is to search for the "EOF" marker in the operation log 366 in a previous version of the clustered database. If the previous version of the clustered database includes an operation log 366 that includes an end of file ("EOF") marker then the operation log 366 is useable. For example, at time 828 the processing module 456 is versioning "VERSION 3" of the clustered database. As part of the versioning of the clustered database, the processing module 456 identifies the previous version of the clustered database includes the operation log 366 (e.g., VERSION "2") with an end of file ("EOF") marker. Accordingly, the operation log 366 for VERSION "3" is useable. Further for example, at time 826, the previous version of the clustered database (e.g., VERSION "1") includes an operation log 366 that does not include an end of file ("EOF") marker. Accordingly, the operation log 366 for VERSION "2" is not useable.

In some embodiments, the processing module 456 may discard an operation log 366 that is unusable (e.g., between time 824 and time 826). For example, during the versioning of the second version, (e.g., "VERSION 2"), the processing module 456 may discard the operation log 366 between time 824 and time 826 responsive to identifying the end of file ("EOF") marker in the in the current version of the operation log 366. Further for example, during the versioning of the third version, (e.g., "VERSION 3"), the processing module 456 may discard the operation log 366 responsive to identifying the end of file ("EOF") marker in the previous version of the operation log 366 between time 824 and time 826, and so on.

Figure 7A:
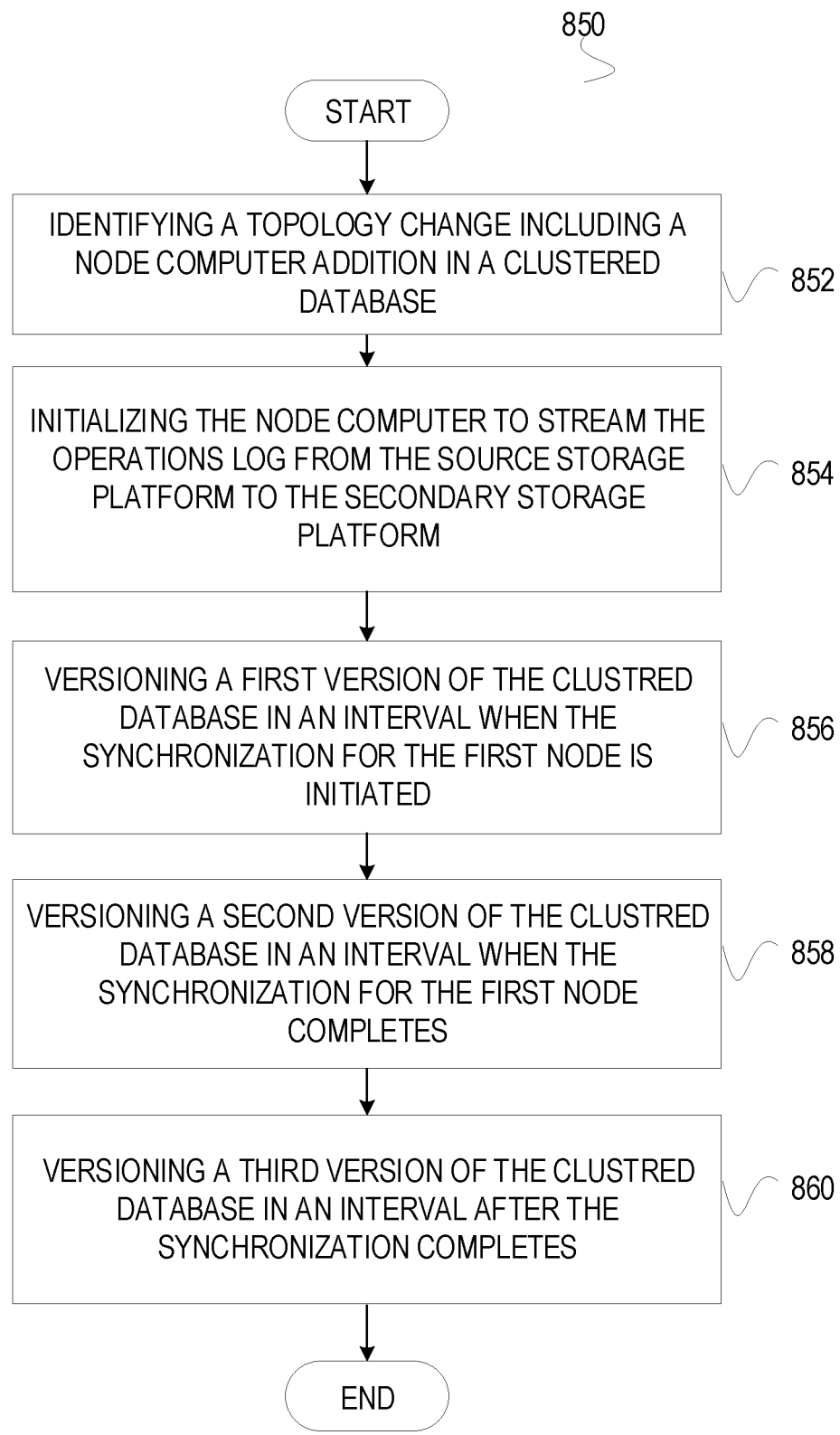
FIG. 7A is a block diagram illustrating a method, according to an embodiment, to for node consistency in a clustered database.

FIG. 7A is a block diagram illustrating a method 850, according to an embodiment, for node consistency in a clustered database. The method 850 commences at operation 852, at the secondary storage platform 360, with the processing module 456 identifying a topology change to the clustered database. For example, the processing module 456 may identify a node computer addition 303 to a clustered database on the source storage platform 302. The processing module 456 identifies the node addition as describe in association with FIG. 5A and supporting figures.

At operation 854, the processing module 456 initializes the node computer 303 at the source storage platform 302 to stream the operations log 366 from the source storage platform 302 to the secondary storage platform 360. For example, the processing module 456, may initialize the node computer 303 by communicating a node agent 362 to the node computer 303 that is configured to stream the operations log 366, as described in operation 712 of FIG. 5A.

At operation 856, the processing module 456 versions a first version of the clustered database in an interval when the synchronization for a node computer 303 (e.g., first node) is initiated. In this example, the processing module 456 identifies whether an operation log 366 may be registered as "STABLE" by identifying whether an end of file ("EOF") marker is found in the operation log 366 in the previous version. In this example, the version previous to the first version (see FIG. 6B, above "VERSION 1") does not include the end of file ("EOF") marker. Accordingly, a status of "UNSTABLE" remains registered in association with the node computer 303.

At operation 858, the processing module 456 versions a second version of the clustered database in an interval when the synchronization for a node computer 303 (e.g., first node) completes. Again, the processing module 456 identifies whether the operation log 366 may be registered as "STABLE" by identifying whether an end of file ("EOF") marker is found in the operation log 366 in the previous version (e.g., VERSION 1). In this example, the first version (see FIG. 6B, above "VERSION 1") does not include the end of file ("EOF") marker. Accordingly, a status of "UNSTABLE" remains registered in association with the node computer 303.

At operation 860, the processing module 456 versions a third version of the clustered database in an interval when the synchronization for a node computer 303 (e.g., first node) was previously completed. In this example, the second version (see FIG. 6B, above "VERSION 2") includes the end of file ("EOF") marker. Accordingly, the processing module registers a status of "STABLE" in node status 568 of the node information association with the node computer 303.

Shard Consistency in a Clustered Database

Figure 8A:
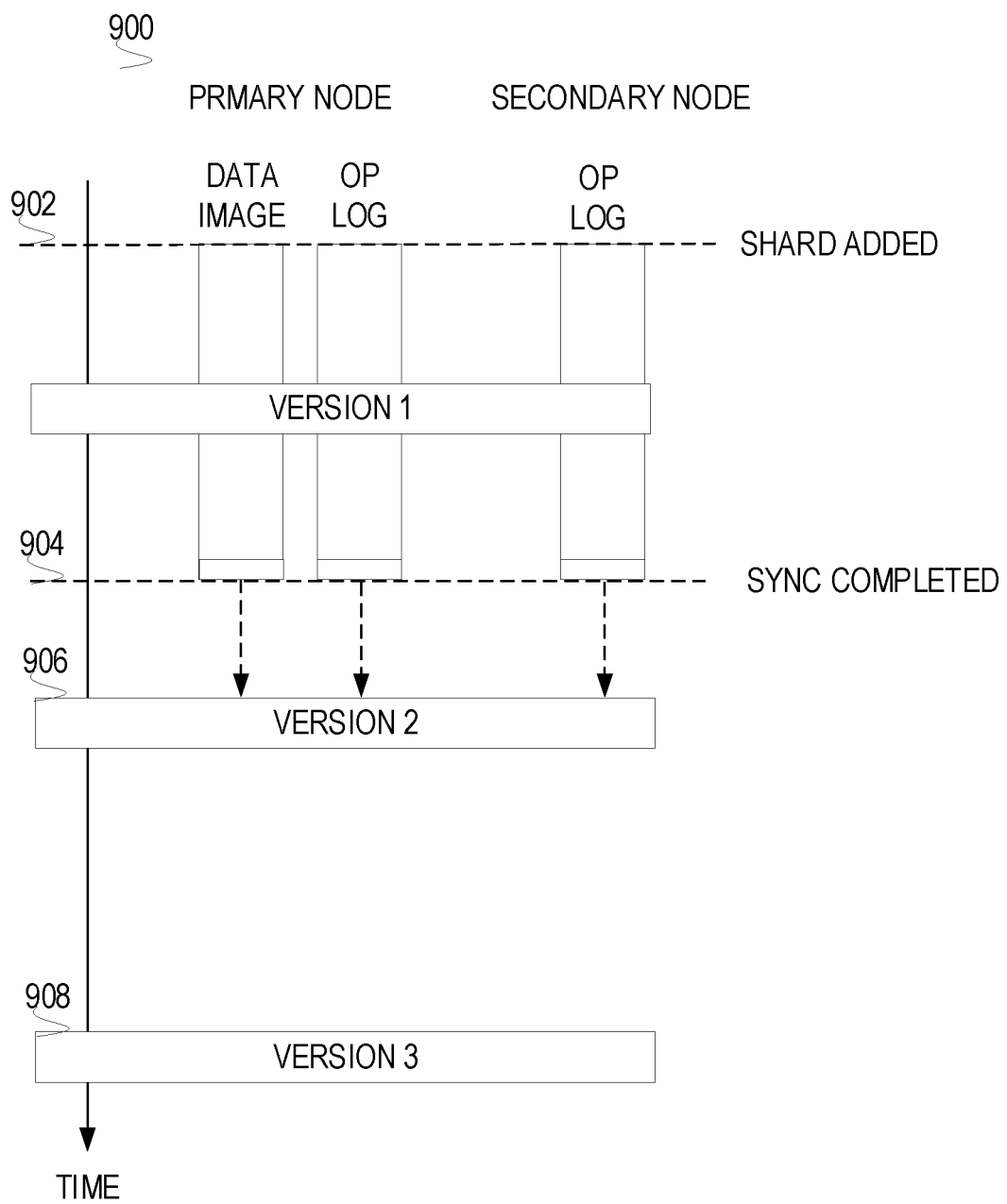
FIG. 8A is a block diagram illustrating a technical problem, according to an embodiment.

FIG. 8A is a block diagram illustrating a technical problem 800, according to an embodiment. The technical problem 800 illustrates problem associated with a backup synchronization of a shard. As in FIG. 6A, illustrated from top to bottom are three versions, "VERSION 1," "VERSION 2," and "VERSION 3" in a time sequence moving from earlier time to later time (e.g., "VERSION 1" at 1 PM, "VERSION 2" at 2PM, "VERSION 3" at 3PM, and so on. The technical problem includes four additional times on the time axis including time 902, time 904, 906, and 908.

At time 902, the control computer 424 receives a topology message 650 indicating a shard was added on the source storage platform 302. Responsive to identifying the shard was added, the processing module initiates a synchronization backup with the corresponding source nodes computers 303 on the source storage platform 302 causing node agents 362, at the node computers 303, to begin streaming. For example, a node agent 362 at a primary node computer 303, on the left, begins streaming a data image 364 and an operation log 366 at time 902. In addition, a node agent 362, at a secondary node computer 303, on the right, brings streaming an operation log 366 at time 902. Recall that a shard maintains a single data image 364 and redundant copies of the operation log 366 from respective node computers 310. At time 904, the backup synchronization completes, however, the data image 364 and the operation logs 366 for the added shard are not consistent with the other shards in the database cluster. The data image 364 and the operation logs 366 for the added shard are not consistent with the other shards in the database cluster because the other shards are versioned on version boundaries. Accordingly, the technical problem 800 is how to make streams of a data image 364 and operation log 366 for an initialized shard consistent with the other shards in the database cluster.

Figure 8B:
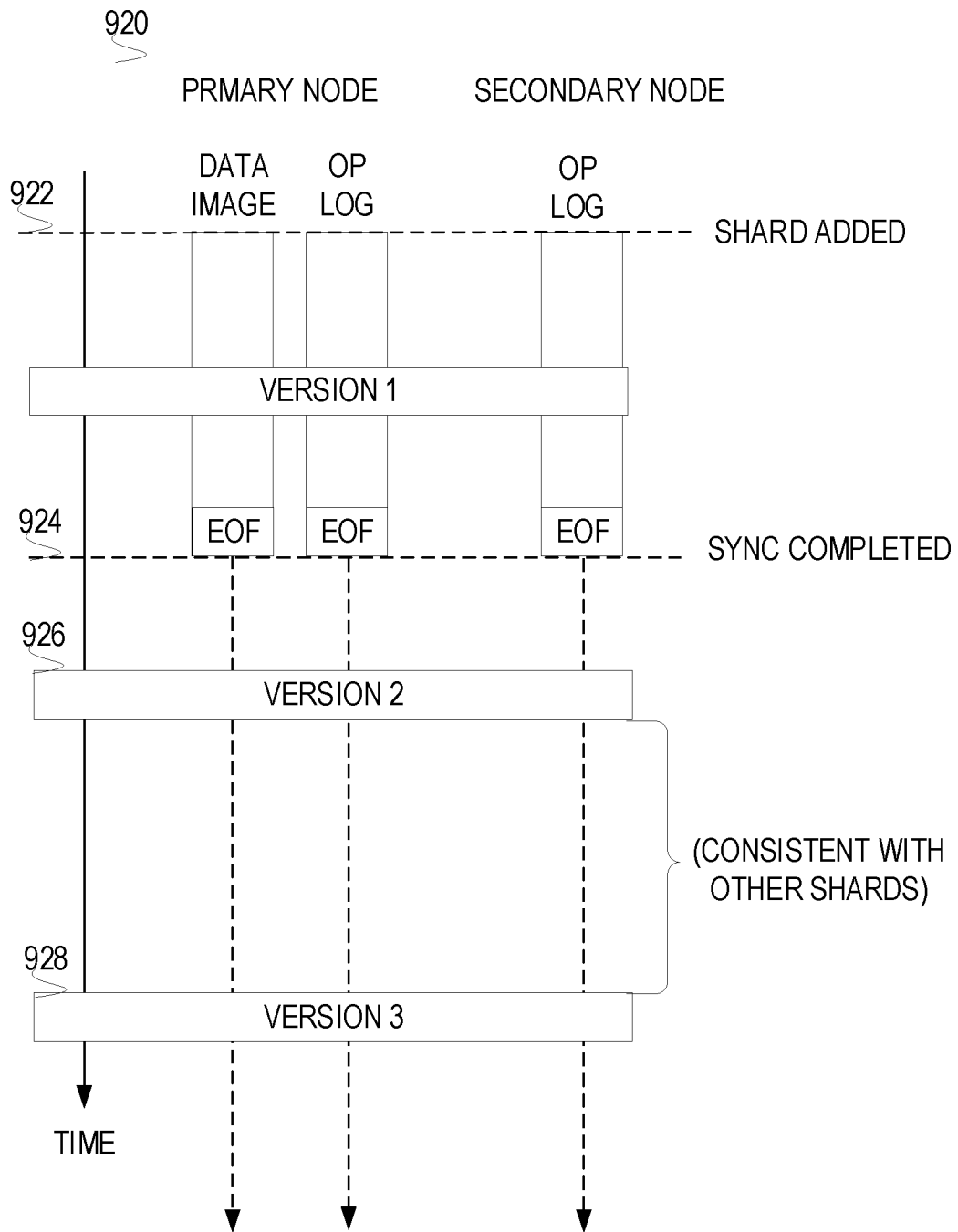
FIG. 8B is a block diagram illustrating a technical solution, according to an embodiment.

FIG. 8B is a block diagram illustrating a technical solution 920, according to an embodiment. The technical solution 920 corresponds to the technical problem 900 and is a solution to the technical problem 900. As in FIG. 6A, illustrated from top to bottom are three versions, "VERSION 1," "VERSION 2," and "VERSION 3" in a time sequence moving from earlier time to later time (e.g., "VERSION 1" at 1PM, "VERSION 2" at 2PM, "VERSION 3" at 3PM, and so on). The technical solution 920 may be illustrated with the times on the time axis including time 922, time 924, 926, and 928. The technical solution 920 identifies a version that an added shard may begin utilizing the same timestamp 490 as the other shards. For a version of the clustered database, the processing module 456 utilizes the same timestamp 490 for the added shard as is being used for the other shards responsive to identifying an end of file ("EOF") marker in the previous version of the data image 364. Accordingly, if the processing module 456 identifies a previous version of the data image 364 includes an end of file ("EOF") marker then the processing module 456 may utilize the same timestamp 490 for versioning the added shard as is being utilized for versioning the other shards to achieve shard consistency across the database cluster. For example, at time 928, the processing module 456 begins versioning "VERSION 3" of the clustered database. During this versioning, the processing module 456 identifies the previous version of the data image 364 (e.g., VERSION "2") includes an end of file ("EOF") marker. Accordingly, the processing module 456 utilizes the same timestamp 490 for versioning the added shard as is being utilized for versioning the other shards beginning in VERSION "3." For example, the processing module 456 stores the current time in the timestamp 490 for all the shard information 480 in versioning "VERSION 3" of the clustered database. Further for example, at time 926, (e.g., versioning of "VERSION 2") the processing module 456 identifies the previous version of the data image 364 (e.g., VERSION "1") as not including an end of file ("EOF") marker in the data image 364. Accordingly, in versioning "VERSION 2," the processing module 456 does not utilize the same timestamp 490 for versioning the added shard as is being utilized for versioning the other shards.

Figure 9:
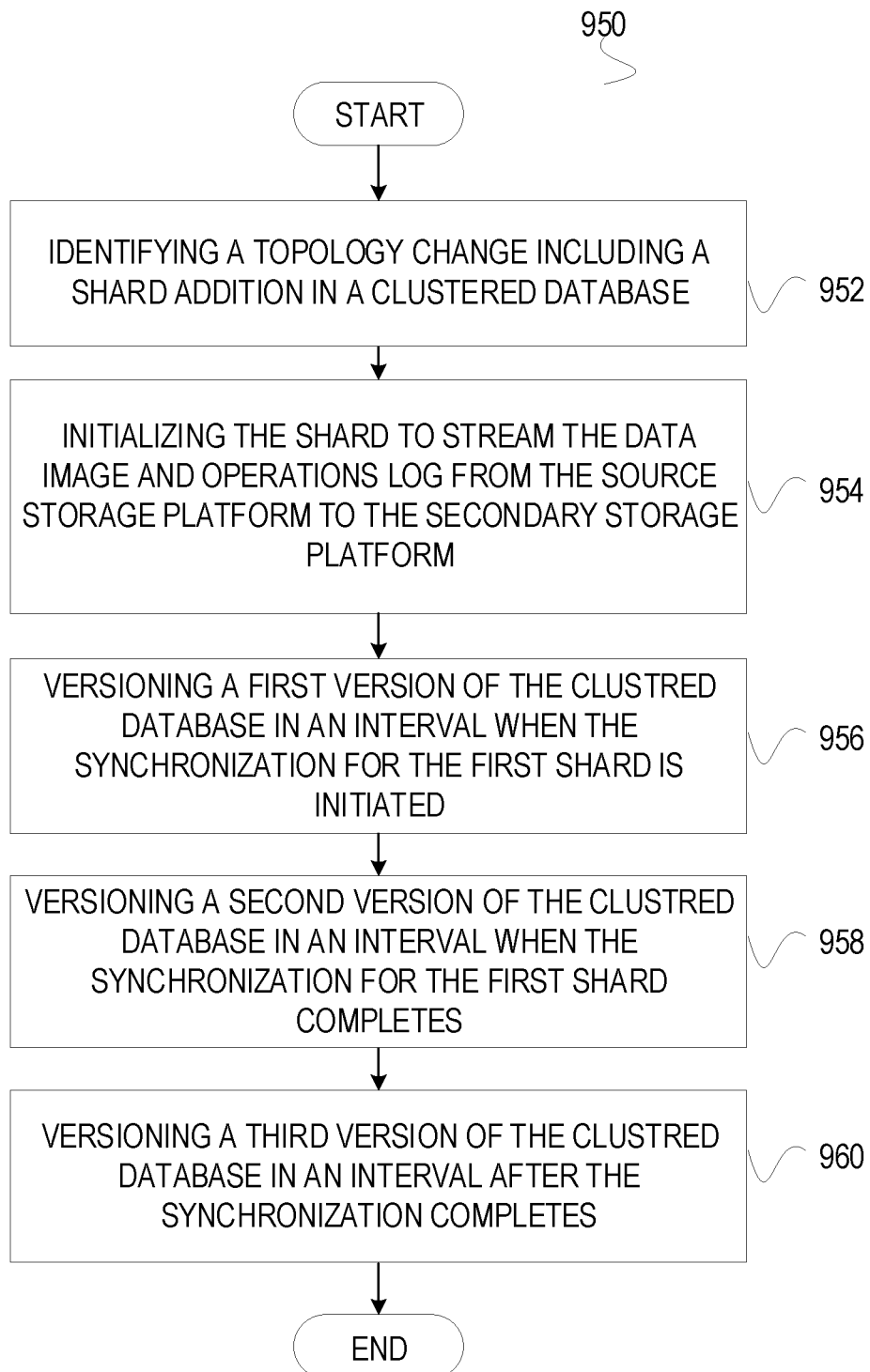
FIG. 9 is a block diagram illustrating a method, according to an embodiment, for shard consistency in a clustered database.

FIG. 9 is a block diagram illustrating a method 950, according to an embodiment, for shard consistency in a clustered database. The method 950 commences at operation 952, at the secondary storage platform 360, with the processing module 456 identifying a topology change to the clustered database. For example, the processing module 456 may identify a shard addition to a clustered database on the source storage platform 302. For example, the processing module 456 identifies the shard addition as described in association with FIG. 4 and supporting figures.

At operation 954, the processing module 456 initializes the shard at the source storage platform 302 to stream the data image 364 and one or more operation logs 366 from the source storage platform 302 to the secondary storage platform 360. For example, the processing module 456, may initialize the shard, as described in operation 704 of FIG. 5A.

At operation 956, the processing module 456 versions a first version (see FIG. 8B, data image 364 and operation logs 366 above "VERSION 1") of the clustered database in an interval when the synchronization for the shard is initiated and not completed. In this example, the version previous to the first version is "VERSION 0." "VERSION 0" does not include an end of file ("EOF") marker in the data image 364 because the shard was added in VERSION 1 and streaming was initiated in VERSION 1. Accordingly, the processing module 456 does not utilize the same timestamp 490 for versioning the added shard as is being utilized for versioning the other shards in versioning the first version.

At operation 958, the processing module 456 versions a second version (see FIG. 8B, data image 364 and operation logs 366 above "VERSION 2") of the clustered database in an interval when the synchronization for the shard completes. In this example, the version previous to the second version is "VERSION 1." "VERSION 1" does not include the end of file ("EOF") marker. Accordingly, the processing module 456 does not utilize the same timestamp 490 for versioning the added shard as is being utilized for versioning the other shards in versioning the second version.

At operation 960, the processing module 456 versions a third version (see FIG. 8B, data image 364 and operation logs 366 above "VERSION 3") of the clustered database in an interval when the synchronization for shard was previously completed. In this example, the version previous to the third version is "VERSION 2." "VERSION 2" includes a data image 364 with an end of file ("EOF") marker. Accordingly, the processing module 456 utilizes the same timestamp 490 for versioning the added shard as is being utilized for versioning the other shards in versioning the third version. Accordingly, in versioning the third version," the timestamp 430 for the added shard (e.g., first shard) is synchronized with the clustered database (e.g., other shards).

Machine and Software Architecture

The modules, methods, engines, applications, and so forth described in conjunction with FIGS. 1-9 are implemented in some embodiments in the context of multiple machines and associated software architectures. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the disclosure in different contexts from the disclosure contained herein.

Software Architecture

Figure 10:
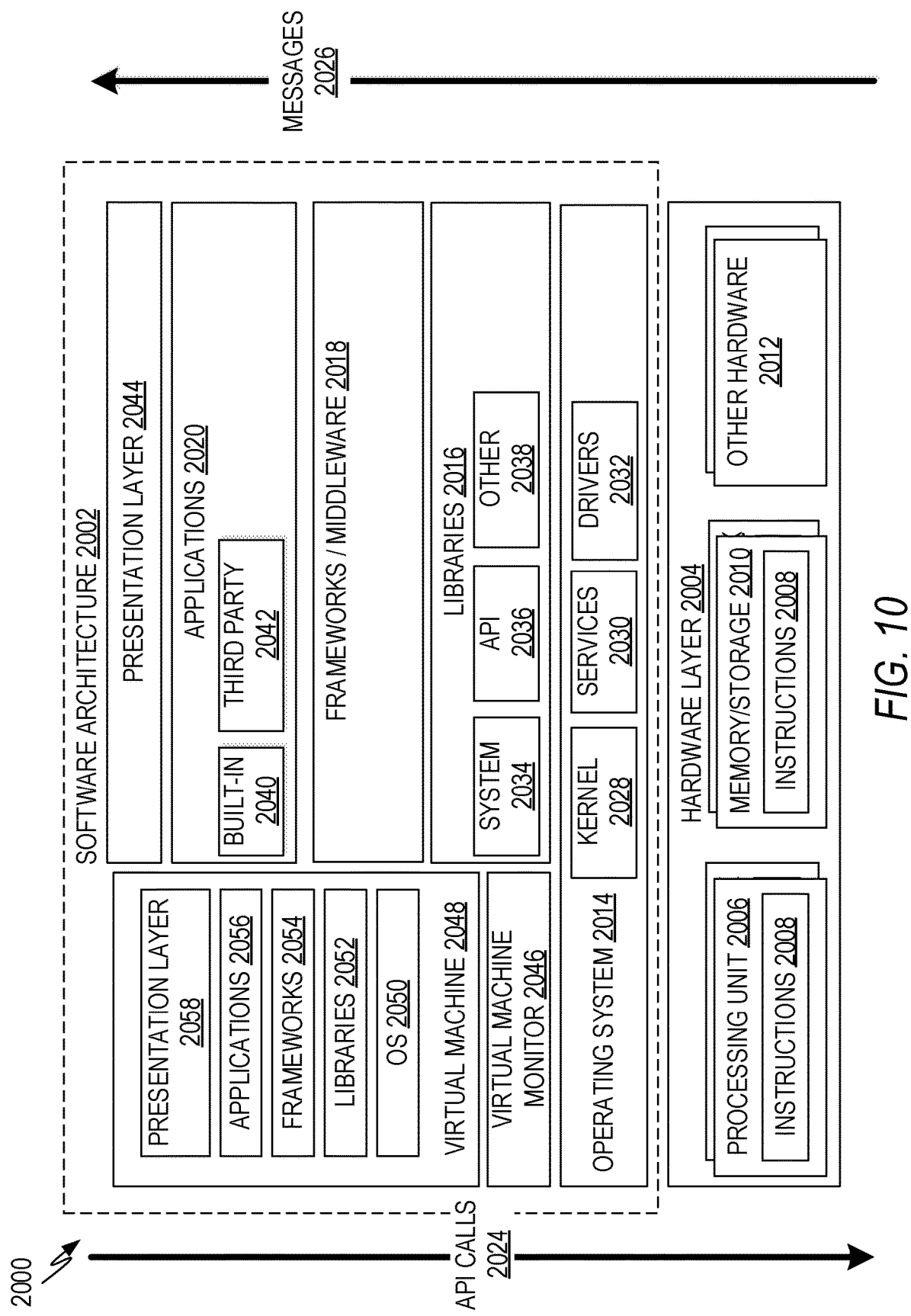
FIG. 10 is a block diagram illustrating a representative software architecture.

FIG. 10 is a block diagram 2000 illustrating a representative software architecture 2002, which may be used in conjunction with various hardware architectures herein described. FIG. 10 is merely a non-limiting example of a software architecture 2002, and it will be appreciated that many other architectures may be implemented to facilitate the functionality described herein. The software architecture 2002 may be executing on hardware such as a machine 2100 of FIG. 11 that includes, among other things, processors 2110, memory/storage 2130, and I/O components 2150. Returning to FIG. 10, a representative hardware layer 2004 is illustrated and can represent, for example, the machine 2100 of FIG. 11. The representative hardware layer 2004 comprises one or more processing units 2006 having associated executable instructions 2008. The executable instructions 2008 represent the executable instructions of the software architecture 2002, including implementation of the methods, engines, modules, and so forth of FIGS. 1-9. The hardware layer 2004 also includes memory and/or storage modules 2010, which also have the executable instructions 2008. The hardware layer 2004 may also comprise other hardware 2012, which represents any other hardware of the hardware layer 2004, such as the other hardware 2012 illustrated as part of the machine 2100.

In the example architecture of FIG. 10, the software architecture 2002 may be conceptualized as a stack of layers where each layer provides particular functionality. For example, the software architecture 2002 may include layers such as an operating system 2014, libraries 2016, frameworks/middleware 2018, applications 2020, and a presentation layer 2044. Operationally, the applications 2020 and/or other components within the layers may invoke application programming interface (API) calls 2024 through the software stack and receive a response, returned values, and so forth, illustrated as messages 2026, in response to the API calls 2024. The layers illustrated are representative in nature, and not all software architectures have all layers. For example, some mobile or special purpose operating systems 2014 may not provide a frameworks/middleware 2018 layer, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2016 may provide a common infrastructure that may be utilized by the applications 2020 and/or other components and/or layers. The libraries 2016 typically provide functionality that allows other software modules to perform tasks in an easier fashion than to interface directly with the underlying operating system 2014 functionality (e.g., kernel 2028, services 2030, and/or drivers 2032). The libraries 2016 may include system 2034 libraries (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media formats such as moving picture experts group (MPEG) 4, H.264, MPEG-1 or MPEG-2 Audio Layer (MP3), AAC, AMR, joint photography experts group (JPG), or portable network graphics (PNG)), graphics libraries (e.g., an Open Graphics Library (OpenGL) framework that may be used to render 2D and 3D graphic content on a display), database libraries (e.g., Structured Query Language (SQL), SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules.

The frameworks 2018 (also sometimes referred to as middleware) may provide a higher-level common infrastructure that may be utilized by the applications 2020 and/or other software components/modules. For example, the frameworks/middleware 2018 may provide various graphic user interface (GUI) functions, high-level resource management, high-level location services, and so forth. The frameworks/middleware 2018 may provide a broad spectrum of other APIs that may be utilized by the applications 2020 and/or other software components/modules, some of which may be specific to a particular operating system 2014 or platform.

The applications 2020 include built-in applications 2040 and/or third party applications 2042. Examples of representative built-in applications 2040 may include, but are not limited to, a contacts application, a browser application, a book reader application, a location application, a media application, a messaging application, and/or a game application. Third party applications 2042 may include any of the built-in applications as well as a broad assortment of other applications 2020. In a specific example, the third party application 2042 (e.g., an application developed using the Android™ or iOS™ software development kit (SDK) by an entity other than the vendor of the particular platform) may be mobile software running on a mobile operating system 2014 such as iOS™, Android™, Windows® Phone, or other mobile operating systems 2014. In this example, the third party application 2042 may invoke the API calls 2024 provided by the mobile operating system such as the operating system 2014 to facilitate functionality described herein.

The applications 2020 may utilize built-in operating system functions (e.g., kernel 2028, services 2030, and/or drivers 2032), libraries (e.g., system libraries 2034, API libraries 2036, and other libraries 2038), and frameworks/middleware 2018 to create user interfaces to interact with users of the system. Alternatively, or additionally, in some systems, interactions with a user may occur through a presentation layer, such as the presentation layer 2044. In these systems, the application/module "logic" can be separated from the aspects of the application/module that interact with a user.

Some software architectures 2002 utilize virtual machines. In the example of FIG. 10, this is illustrated by a virtual machine 2048 (e.g., virtual machine 4008). The virtual machine 2048 creates a software environment where applications/modules can execute as if they were executing on a hardware machine (such as the machine 2100 of FIG. 11, for example). The virtual machine 2048 is hosted by a host operating system (e.g., operating system 2014 in FIG. 10) and typically, although not always, has a virtual machine monitor 2046, which manages the operation of the virtual machine 2048 as well as the interface with the host operating system (e.g., operating system 2014). A software architecture executes within the virtual machine 2048, such as an operating system 2050, libraries 2052, frameworks/middleware 2054, applications 2056, and/or a presentation layer 2058. These layers of software architecture executing within the virtual machine 2048 can be the same as corresponding layers previously described or may be different.

Example Machine Architecture and Machine-Readable Medium

Figure 11:
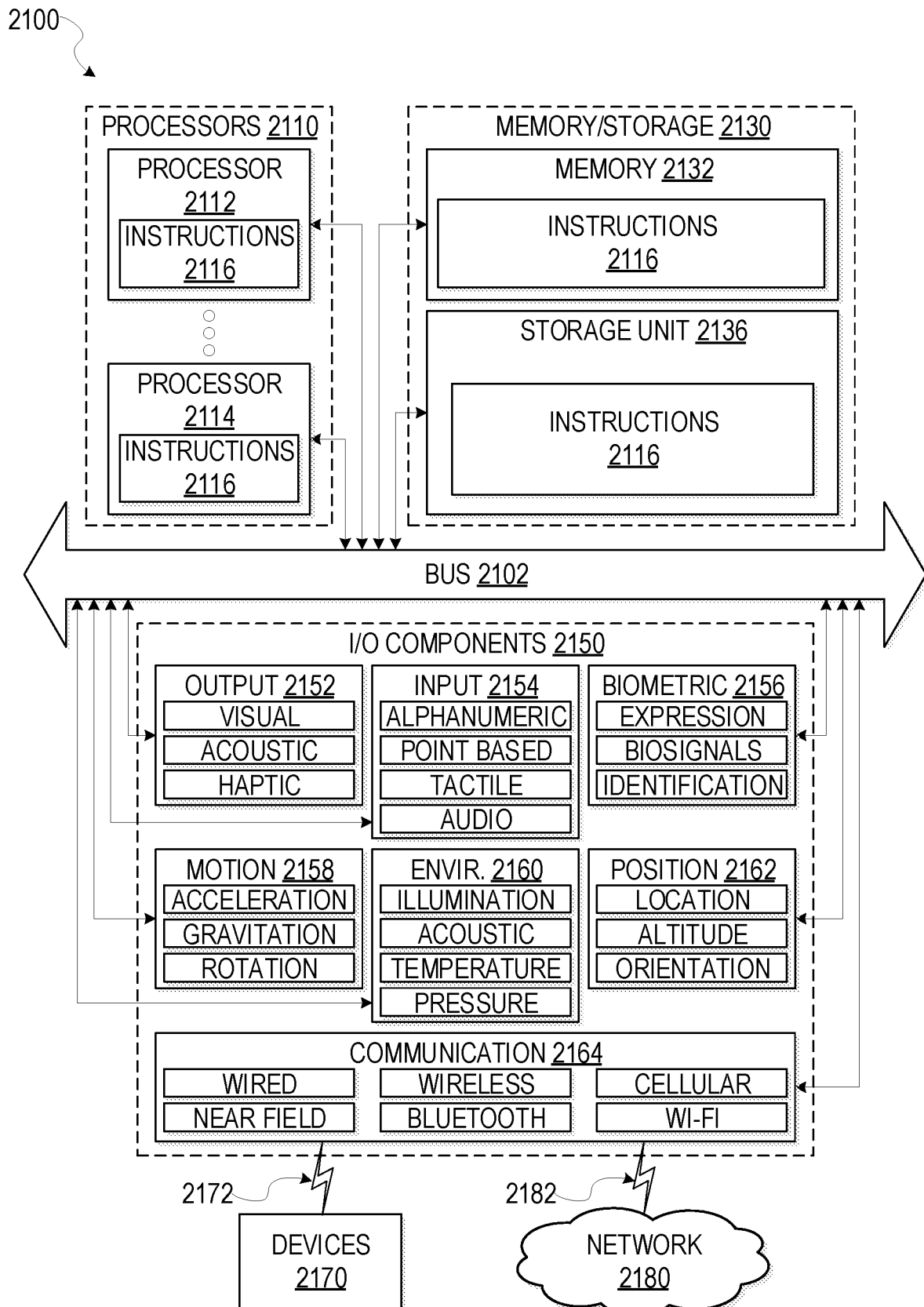
FIG. 11 is a block diagram illustrating components of a machine, according to some example embodiments.

FIG. 11 is a block diagram illustrating components of a machine 2100, according to some example embodiments, able to read instructions from a machine-readable medium (e.g., a machine-readable storage medium) and perform any one or more of the methodologies discussed herein. Specifically, FIG. 11 shows a diagrammatic representation of the machine 2100 in the example form of a computer system, within which instructions 2116 (e.g., software, a program, an application, an applet, an app, or other executable code) for causing the machine 2100 to perform any one or more of the methodologies discussed herein may be executed. For example, the instructions 2116 may cause the machine 2100 to execute the flow diagrams of FIGS. 4, 5A, 5B, 7A, and 9. Additionally, or alternatively, the instructions 2116 may implement the modules, engines, applications, and so forth, as described in this document. The instructions 2116 transform the general, non-programmed machine 2100 into a particular machine 2100 programmed to carry out the described and illustrated functions in the manner described. In alternative embodiments, the machine 2100 operates as a standalone device or may be coupled (e.g., networked) to other machines 2100. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 2100 capable of executing the instructions 2116, sequentially or otherwise, that specify actions to be taken by the machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory/storage 2130, and I/O components 2150, which may be configured to communicate with each other such as via a bus 2102. In an example embodiment, the processors 2110 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 2112 and a processor 2114 that may execute the instructions 2116. The term "processor" is intended to include multi-core processors 2110 that may comprise two or more independent processors 2110 (sometimes referred to as "cores") that may execute the instructions 2116 contemporaneously. Although FIG. 11 shows multiple processors 2110, the machine 2100 may include a single processor 2110 with a single core, a single processor 2110 with multiple cores (e.g., a multi-core processor), multiple processors 2110 with a single core, multiple processors 2110 with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116, embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of the processors 2110 are examples of machine-readable media.

As used herein, "machine-readable medium" means a device able to store the instructions 2116 and data temporarily or permanently and may include, but not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 2116. The term "machine-readable medium" shall also be taken to include any medium, or combination of multiple media, that is capable of storing instructions (e.g., instructions 2116) for execution by a machine (e.g., machine 2100), such that the instructions, when executed by one or more processors of the machine (e.g., processors 2110), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2150 may include a wide variety of components to receive input, provide output, produce output, transmit information, exchange information, capture measurements, and so on. The specific I/O components 2150 that are included in a particular machine 2100 will depend on the type of machine. For example, portable machines 2100 such as mobile phones will likely include a touch input device or other such input mechanisms, while a headless server machine will likely not include such a touch input device. It will be appreciated that the I/O components 2150 may include many other components that are not shown in FIG. 11. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components. For example, the biometric components 2156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 2162 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via a coupling 2182 and a coupling 2172 respectively. For example, the communication components 2164 may include a network interface component or other suitable device to interface with the network 2180. In further examples, the communication components 2164 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 2170 may be another machine 2100 or any of a wide variety of peripheral devices (e.g., a peripheral device coupled via a USB).

Moreover, the communication components 2164 may detect identifiers or include components operable to detect identifiers. For example, the communication components 2164 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 2180 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or another type of cellular or wireless coupling. In this example, the coupling 2182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)). Similarly, the instructions 2116 may be transmitted or received using a transmission medium via the coupling 2172 (e.g., a peer-to-peer coupling) to the devices 2170. The term "transmission medium" shall be taken to include any intangible medium that is capable of storing, encoding, or carrying the instructions 2116 for execution by the machine 2100, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
   at least one processor and memory having instructions that, when executed, cause the at least one processor to perform operations comprising:
   at a secondary storage platform:
   identifying a first topology change in a clustered database, the identifying being based on a first message received, over a network, from a source storage platform, the source storage platform storing a clustered database including a data image including a first plurality of documents including a first document, the first topology change including automatically identifying an addition of a first node to the clustered database on the source storage platform;
   initializing the first node on the source storage platform based on the first topology change, the initializing comprising:
      communicating a first node agent to the first node, the first node agent being configured to execute on the first node to extract an operation log at the source storage platform and stream the operation log to the secondary storage platform, the streaming causing the operation log at the first node, at the source storage platform, to be synchronized with the operation log associated with the first node at the secondary storage platform, and, subsequent to synchronization, the streaming further causing the operation log associated with the first node at the secondary storage platform to remain synchronized;
   versioning a first version of the clustered database, the first version including a first interval of time including a first start time and a first end time, the versioning of the first version including not storing a version of the operation log associated with the first node at the secondary storage platform responsive to identifying, during the first interval of time, the synchronizing of the operation log at the first node having not been synchronized, in a prior version of the clustered database, with the operation log at the storage platform.

2. The system of claim 1, wherein the identifying the first topology change comprises registering, on the secondary storage platform, the first node as having an unstable status, the registering the unstable status being responsive to the identifying the first topology change.

3. The system of claim 1, wherein the versioning of the first version of the clustered database further comprises identifying the synchronization of the operation log associated with the first node at the secondary storage platform was initialized but not completed during the first interval.

4. The system of claim 3, wherein the identifying the first topology change further includes communicating instructions to the node agents at the first node to start streaming the operations log.

5. The system of claim 1, versioning a second version of the clustered database, the second version including a second interval of time including a second start time and a second end time, the versioning of the second version including storing of a version of the operation log associated with the first node at the secondary storage platform in association with a status of unstable.

6. The system of claim 5, wherein the versioning of the second version of the clustered database further comprises discarding the operations log associated with the first node at the source storage platform.

7. The system of claim 1, versioning a third version of the clustered database, the third version including a third interval of time including a third start time and a third end time, the third end time, the versioning the third version including storing a version of the operation log associated with the first node at the secondary storage, the storing being responsive to identifying the synchronization of the of the operation log at the first node with the operation log at the storage platform in the prior versioning of the clustered database.

8. The system of claim 7, wherein the versioning of the third version of the clustered database further comprises registering, on the secondary storage platform, the first node as having a stable status responsive to the identifying the synchronization of the of the operation log at the first node with the operation log at the storage platform in the prior version of the clustered database.

9. The system of claim 1, further comprising:
identifying a second topology change in the clustered database, the identifying being based on a second message received, over the network, from the source storage platform, the second topology change including automatically identifying a deletion of a second node in the clustered database on the source storage platform, and
wherein the identifying the second topology change further comprises registering, on the secondary storage platform, the second node as having an unstable status, the registering the unstable status for the second node being responsive to the identifying the second topology change; and
wherein the versioning of the first version of the clustered database further comprises discarding the operations log associated with the second node at the source storage platform responsive to identifying the unstable status associated with the second node on the secondary storage platform.

10. A method comprising:
at a secondary storage platform:
identifying a first topology change in a clustered database, the identifying being based on a first message received, over a network, from a source storage platform, the source storage platform storing a clustered database including a data image including a first plurality of documents including a first document, the first topology change including automatically identifying an addition of a first node to the clustered database on the source storage platform, the identifying being performed by at least one processor;
initializing the first node on the source storage platform based on the first topology change, the initializing comprising:
communicating a first node agent to the first node, the first node agent being configured to execute on the first node to extract an operation log at the source storage platform and stream the operation log to the secondary storage platform, the streaming causing the operation log at the first node, at the source storage platform, to be synchronized with the operation log associated with the first node at the secondary storage platform, and, subsequent to synchronization, the streaming further causing the operation log associated with the first node at the secondary storage platform to remain synchronized;
versioning a first version of the clustered database, the first version including a first interval of time including a first start time and a first end time, the versioning of the first version including not storing a version of the operation log associated with the first node at the secondary storage platform responsive to identifying, during the first interval of time, the synchronizing of the operation log at the first node having not been synchronized, in a prior version of the clustered database, with the operation log at the storage platform.

11. The method of claim 10, wherein the identifying the first topology change comprises registering, on the secondary storage platform, the first node as having an unstable status, the registering the unstable status being responsive to the identifying the first topology change.

12. The method of claim 10, wherein the versioning of the first version of the clustered database further comprises identifying the synchronization of the operation log associated with the first node at the secondary storage platform was initialized but not completed during the first interval.

13. The method of claim 12, wherein the identifying the first topology change further includes communicating instructions to the node agents at the first node to start streaming the operations log.

14. The method of claim 10, versioning a second version of the clustered database, the second version including a second interval of time including a second start time and a second end time, the versioning of the second version including storing of a version of the operation log associated with the first node at the secondary storage platform in association with a status of unstable.

15. The method of claim 14, wherein the versioning of the second version of the clustered database further comprises discarding the operations log associated with the first node at the source storage platform.

16. The method of claim 10, versioning a third version of the clustered database, the third version including a third interval of time including a third start time and a third end time, the third end time, the versioning the third version including storing a version of the operation log associated with the first node at the secondary storage, the storing being responsive to identifying the synchronization of the of the operation log at the first node with the operation log at the storage platform in the prior versioning of the clustered database.

17. The method of claim 16, wherein the versioning of the third version of the clustered database further comprises registering, on the secondary storage platform, the first node as having a stable status responsive to the identifying the synchronization of the of the operation log at the first node with the operation log at the storage platform in the prior version of the clustered database.

18. The method of claim 10, further comprising:
identifying a second topology change in the clustered database, the identifying being based on a second message received, over the network, from the source storage platform, the second topology change including automatically identifying a deletion of a second node in the clustered database on the source storage platform, and
wherein the identifying the second topology change further comprises registering, on the secondary storage platform, the second node as having an unstable status, the registering the unstable status for the second node being responsive to the identifying the second topology change; and wherein the versioning of the first version of the clustered database further comprises discarding the operations log associated with the second node at the source storage platform responsive to identifying the unstable status associated with the second node on the secondary storage platform.

19. A non-transitory machine-readable medium and storing a set of instructions that, when executed by a processor, causes a machine to perform operations comprising:

at a secondary storage platform:
identifying a first topology change in a clustered database, the identifying being based on a first message received, over a network, from a source storage platform, the source storage platform storing a clustered database including a data image including a first plurality of documents including a first document, the first topology change including automatically identifying an addition of a first node to the clustered database on the source storage platform, the identifying being performed by at least one processor;

initializing the first node on the source storage platform based on the first topology change, the initializing comprising:
communicating a first node agent to the first node, the first node agent being configured to execute on the first node to extract an operation log at the source storage platform and stream the operation log to the secondary storage platform, the streaming causing the operation log at the first node, at the source storage platform, to be synchronized with the operation log associated with the first node at the secondary storage platform, and, subsequent to synchronization, the streaming further causing the operation log associated with the first node at the secondary storage platform to remain synchronized;

versioning a first version of the clustered database, the first version including a first interval of time including a first start time and a first end time, the versioning of the first version including not storing a version of the operation log associated with the first node at the secondary storage platform responsive to identifying, during the first interval of time, the synchronizing of the operation log at the first node having not been synchronized, in a prior version of the clustered database, with the operation log at the storage platform.

20. The non-transitory machine-readable medium of claim 19, wherein the:

identifying the first topology change further comprises registering, on the secondary storage platform, the first node as having an unstable status, wherein the registering the first node as having the unstable status is responsive to the identifying the first topology change.

* * * * *

UNITED STATES PATENT AND TRADEMARK OFFICE
CERTIFICATE OF CORRECTION

PATENT NO. : 10,997,130 B2  
APPLICATION NO. : 16/264361  
DATED : May 4, 2021  
INVENTOR(S) : Yin et al.

Page 1 of 2

It is certified that error appears in the above-identified patent and that said Letters Patent is hereby corrected as shown below:

In the Drawings

Sheet 1 of 28, Fig. 1A, reference numeral 150, Line 1, delete "DATACENTER" and insert --DATA CENTER-- therefor On sheet 24 of 28, Fig. 8A, delete "PRMARY" and insert --PRIMARY-- therefor On sheet 25 of 28, Fig. 8B, delete "PRMARY" and insert --PRIMARY-- therefor In the Specification In Column 2, Line 25, delete "database," and insert --database;-- therefor In Column 9, Lines 58-59, delete "fileserver." and insert --file server.-- therefor In Column 14, Line 17, delete "/snapshotsNM_B/sVs1.chunk1)." and insert --/snapshotsNM_B/sl/sl.chunkl).-- therefor In Column 17, Line 57, delete "403" and insert --304-- therefor In Column 20, Line 14, delete "306" and insert --307-- therefor In Column 23, Line 52, delete "shared" and insert --shard-- therefor In Column 24, Line 8, delete "477" and insert --476-- therefor In Column 24, Line 62, delete "source" and insert --storage-- therefor In Column 24, Line 64, delete "source" and insert --storage-- therefor Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,997,130 B2

In Column 25, Line 7, delete "662." and insert --462.-- therefor

In Column 27, Line 29, delete "306" and insert --307-- therefor

In Column 28, Line 48, delete "source" and insert --storage-- therefor

In Column 28, Line 49, delete "source" and insert --storage-- therefor

In Column 28, Line 53, delete "source" and insert --storage-- therefor

In Column 28, Line 56, delete "source" and insert --storage-- therefor

In Column 28, Line 63, delete "source" and insert --storage-- therefor

In Column 28, Line 66, delete "source" and insert --storage-- therefor

In Column 29, Line 10, delete "IPM," and insert --1PM,-- therefor

In Column 29, Line 17, delete "source" and insert --storage-- therefor

In Column 29, Line 63, delete "350." and insert --360.-- therefor

In Column 33, Line 5, delete "version,"" and insert --version,-- therefor

In Column 33, Line 6, delete "430" and insert --490-- therefor

In the Claims

In Column 44, Line 23, in Claim 20, delete "the:" and insert --the-- therefor

In Column 44, Line 24, in Claim 20, before "identifying", delete a linebreak